(12) United States Patent
Tazume et al.

(10) Patent No.: US 12,314,892 B2
(45) Date of Patent: May 27, 2025

(54) ARTICLE DELIVERY SYSTEM AND UNMANNED VEHICLE

(71) Applicant: Rakuten Group, Inc., Tokyo (JP)

(72) Inventors: Toshiaki Tazume, Tokyo (JP); Daiki Tanaka, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 531 days.

(21) Appl. No.: 17/671,175

(22) Filed: Feb. 14, 2022

(65) Prior Publication Data

US 2022/0261757 A1 Aug. 18, 2022

(30) Foreign Application Priority Data

Feb. 15, 2021 (JP) .................................. 2021-21613

(51) Int. Cl.
| | |
|---|---|
| G06Q 10/0835 | (2023.01) |
| B64U 70/90 | (2023.01) |
| G05D 1/00 | (2024.01) |
| G06Q 10/083 | (2024.01) |
| G06Q 10/0832 | (2023.01) |
| G06Q 50/40 | (2024.01) |
| B64U 101/64 | (2023.01) |

(52) U.S. Cl.
CPC ..... *G06Q 10/08355* (2013.01); *G05D 1/0225* (2013.01); *G05D 1/101* (2013.01); *G06Q 10/0832* (2013.01); *G06Q 10/0838* (2013.01); *G06Q 50/40* (2024.01); *B64U 70/90* (2023.01); *B64U 2101/64* (2023.01); *B64U 2201/10* (2023.01)

(58) Field of Classification Search
CPC .................................................. B64U 2101/64
See application file for complete search history.

(56) References Cited

U.S. PATENT DOCUMENTS

| | | | |
|---|---|---|---|
| 11,308,537 B1* | 4/2022 | Bell | G06Q 30/0629 |
| 2017/0220986 A1 | 8/2017 | Putcha et al. | |
| 2019/0213533 A1* | 7/2019 | Green | G06Q 20/203 |
| 2019/0287063 A1* | 9/2019 | Skaaksrud | G06Q 10/0832 |
| 2021/0295409 A1* | 9/2021 | Rudmann | G06Q 30/0631 |

FOREIGN PATENT DOCUMENTS

| | | |
|---|---|---|
| CN | 211418604 U | 9/2020 |
| JP | 2020-007148 A | 1/2020 |

OTHER PUBLICATIONS

Eda Yucel, Optimizing product assortment under customer-driven demand substitution, Aug. 9, 2008, (Year: 2008).*
Translation of Chinese Office Action in CN Appl No. 202210127892.6 dated Feb. 14, 2025.

* cited by examiner

Primary Examiner — Ismail A Manejwala
(74) Attorney, Agent, or Firm — Sughrue Mion, PLLC

(57) ABSTRACT

An article delivery system S acquires alternative article selection information indicating an alternative article selected by a user related to the delivery destination from among the one or more alternative articles after the unmanned vehicle starts moving toward the delivery destination; and performs control for transferring the alternative article indicated by the alternative article selection information at the delivery destination.

11 Claims, 12 Drawing Sheets

ARTICLE DELIVERY SYSTEM AND UNMANNED VEHICLE

CROSS REFERENCE TO RELATED APPLICATION

This application claims priority from Japanese Patent Application No. 2021-21613 which was filed on Feb. 15, 2021, the disclosure of which is herein incorporated by reference in its entirety.

TECHNICAL FIELD

One or more embodiments of the present invention relates to a technical field such as a system for delivering an article to a delivery destination by using an unmanned vehicle.

RELATED ART

In the related art, it has been studied to deliver an article such as an item to a delivery destination such as a home by using an unmanned vehicle. JP 2020-7148 A describes a delivery system in which an unmanned vehicle that picks up an ordered item at a collection site moves to a delivery destination and directly transfers the ordered item to a user of the delivery destination. It is expected that the item is delivered by using the unmanned vehicle in an online supermarket that delivers an item for which an order is accepted on the Internet.

However, in many cases, since a stock common to a real store is used in the online supermarket, even though there is an item that is displayed as in stock on an Internet site of the online supermarket and can be designated by a user for order, there is a case where the item is out of stock in practice, such as a case where the item is in a state of being in a shopping basket of a store visitor at the real store. That is, after the item is designated as a delivery target, the item may be found to be undeliverable. In such a case, when the user selects an alternative article for an item that is out of stock and then the alternative article is loaded on the unmanned vehicle, it takes time and effort to start the delivery of the alternative article.

Therefore, one or more embodiments of the present invention are directed to providing an article delivery system and an unmanned vehicle capable of efficiently delivering an alternative article of an article even when it is found that an article is undeliverable after the article is designated as a delivery target for a delivery destination.

SUMMARY

In response to the above issue, the article delivery system includes: an unmanned vehicle; at least one memory configured to store program code; and at least one processor configured to access the program code and operate as instructed by the program code. The unmanned vehicle is configured to load one or more alternative articles for an article designated as a delivery target for a delivery destination, the article being found to be undeliverable after the article is designated. The program code includes: acquisition code configured to cause the at least one processor to acquire alternative article selection information indicating an alternative article selected by a user related to the delivery destination from among the one or more alternative articles after the unmanned vehicle starts moving toward the delivery destination; and transfer control code configured to cause the at least one processor to perform control for transferring the alternative article indicated by the alternative article selection information at the delivery destination.

The acquisition code may cause the at least one processor to acquire the alternative article selection information indicating the alternative article selected by the user from among a plurality of the alternative articles set for the article in advance.

The program code further may include presentation code configured to cause the at least one processor to present the alternative articles loaded on the unmanned vehicle to the user in a selectable manner. The acquisition code may cause the at least one processor to acquire the alternative article selection information indicating the alternative article selected by the user from among the presented alternative articles.

The presentation code may cause the at least one processor to, when an alternative article is not selected by the user from among the presented alternative articles, present a different alternative article not loaded on the unmanned vehicle to the user. The program code further may include movement control code configured to cause the at least one processor to, when the different alternative article is selected by the user, move the unmanned vehicle or a different unmanned vehicle toward the delivery destination, the unmanned vehicle or the different unmanned vehicle having (loading) the different alternative article.

The presentation code may cause the at least one processor to present, to the user, the different alternative article and a required time until the unmanned vehicle or the different unmanned vehicle having the different alternative article arrives at the delivery destination.

The program code further may include: notifying code configured to cause the at least one processor to notify the user of the alternative article before or after the unmanned vehicle starts moving toward the delivery destination; and acceptance code configured to cause the at least one processor to accept cancellation of designation of the article.

The program code further may include movement control code configured to cause the at least one processor to, when the cancellation is accepted after the unmanned vehicle starts moving toward the delivery destination, stop the movement, and move the unmanned vehicle toward a predetermined base or a different delivery destination.

The program code further may include setting code configured to cause the at least one processor to preferentially set, as an alternative article to be loaded on the unmanned vehicle, an alternative article having a relatively high degree of relevance among a plurality of the alternative articles, on a basis of relevance degree information indicating a degree of relevance between the article and the alternative article for each the plurality of alternative articles.

The program code further may include setting code configured to cause the at least one processor to preferentially set, as an alternative article to be loaded on the unmanned vehicle, an alternative article having a relatively high number of times or a relatively high frequency among a plurality of the alternative articles, on a basis of history information indicating the number of times or frequency that the alternative article has been selected in the past as the alternative article for the article for each the plurality of alternative articles.

The article may be an item for which payment is completed. The program code further may include processing code configured to cause the at least one processor to, when there is a difference in price between the item and the alternative article selected by the user, perform processing of eliminating the difference before the control for transferring the alternative article is performed.

The unmanned vehicle may include at least one memory configured to store program code; and at least one processor configured to access the program code and operate as instructed by the program code. The program code may includes: movement control code configured to cause the at least one processor to move the unmanned vehicle toward the delivery destination; acquisition code configured to cause the at least one processor to acquire alternative article selection information indicating an alternative article selected by a user related to the delivery destination from among the one or more alternative articles after the unmanned vehicle starts moving toward the delivery destination; and transfer control code configured to cause the at least one processor to perform control for transferring the alternative article indicated by the alternative article selection information at the delivery destination.

DETAILED DESCRIPTION

Hereinafter, one or more embodiments of the present invention will be described in detail with reference to the drawings.

[1. Configuration of Article Delivery System S]

Figure 1:
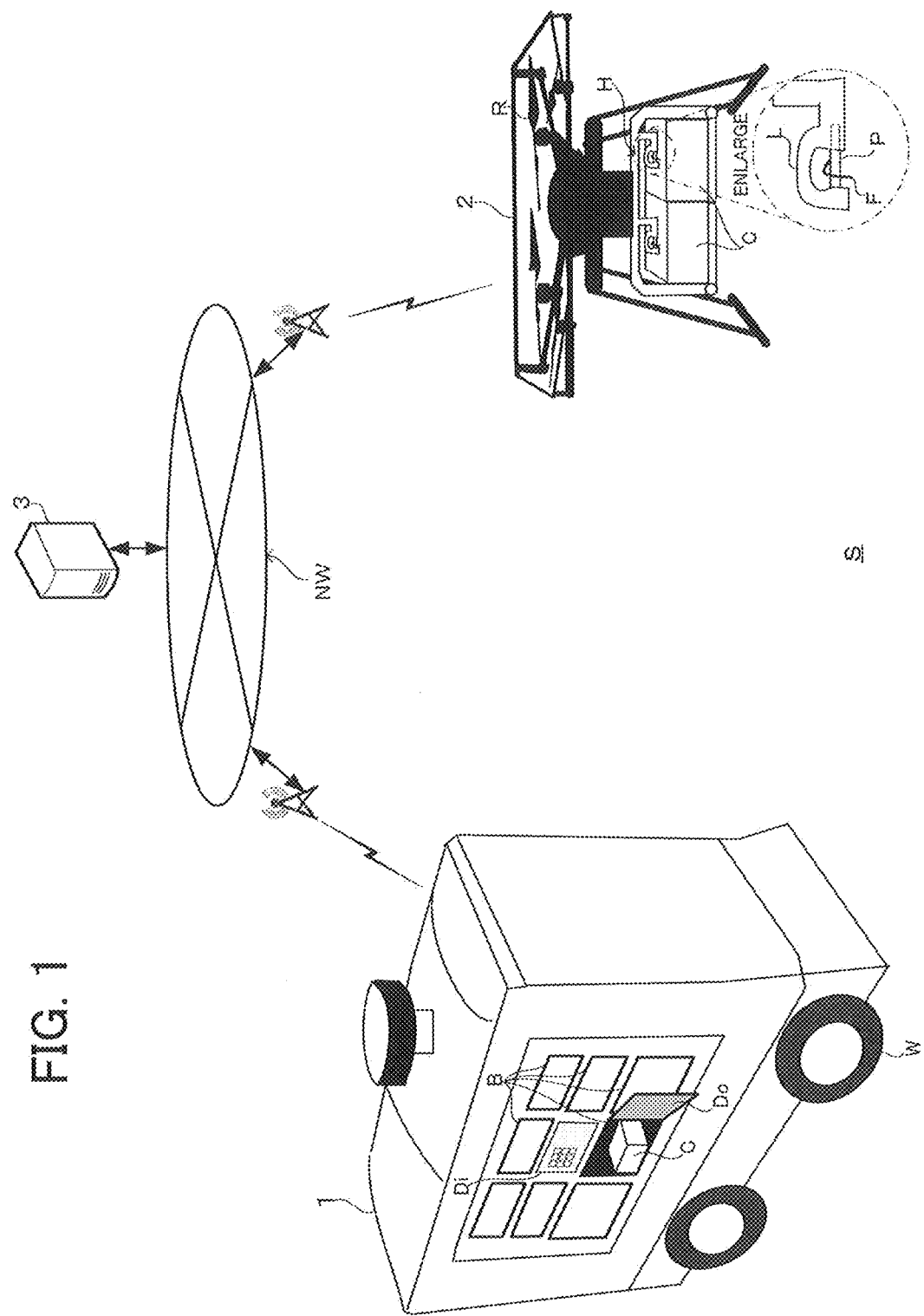
FIG. 1 is a view illustrating a schematic configuration example of an article delivery system S.

First, a configuration of an article delivery system S according to an embodiment of the present invention will be described with reference to FIG. 1. FIG. 1 is a view illustrating a schematic configuration example of the article delivery system S. As illustrated in FIG. 1, the article delivery system S includes an unmanned ground vehicle (hereinafter, referred to as "UGV (Unmanned Ground Vehicle)") 1, an unmanned aerial vehicle (hereinafter, referred to as "UAV (Unmanned Aerial Vehicle)") 2, and a management server 3. Here, the management server 3 can communicate with, for example, a POS (Point Of Sale) system (not illustrated) of a real store and a commerce system (not illustrated) that manages EC (Electronic Commerce) site such as an online supermarket. Moreover, the management server 3 can communicate with the UGV 1 and the UAV 2 via a communication network NW. Incidentally, the communication network NW includes, for example, the Internet, a mobile communication network, a radio base station thereof, and the like.

Each of the UGV 1 and the UAV 2 is an example of an unmanned mobile object. In the following description, when both or any one of the UGV 1 and the UAV 2 is referred to, both or any one of the UGV and the UAV is referred to as an unmanned vehicle. The UGV 1 can autonomously travel on the ground in an unmanned manner. The UGV 1 may be a vehicle having a plurality of wheels, a robot (for example, a bipedal locomotion robot) having no wheels, or the like. The UAV 2 is also called a drone or a multicopter, and can autonomously fly in the air in an unmanned manner. The unmanned vehicle loads an article (hereinafter, referred to as "designated article") designated as a delivery target for a delivery destination and delivers the article to the delivery destination. However, when it is found that the article is undeliverable after the designated article is designated as the delivery target, the unmanned vehicle loads one or more alternative articles for the designated article and delivers the alternative articles to the delivery destination. The alternative articles for the designated article become delivery targets instead of the designated article, and one or a plurality of alternative articles are set in advance for the designated article (that is, the article corresponding to the alternative articles). Moreover, it is desirable that the alternative articles for the designated article are the same type (category) of articles as the designated article. In the present embodiment, although an ordered item (product) ordered on the EC site will be described as an example of the article, the article may be a gift given as a catalog gift or the like.

In a case where the alternative article for the designated article is delivered to the delivery destination, after the unmanned vehicle having the alternative article loaded thereon starts moving toward the delivery destination, for example, any one or a plurality of alternative articles is selected from among the plurality of alternative articles by a user related to the delivery destination. However, in a case where the user related to the delivery destination does not desire the alternative article for the designated article, the alternative article may not be selected by the user. Here, the user related to the delivery destination is a delivery requester or a recipient. The delivery destination is, for example, a delivery place where the article (designated article or alternative article) is transferred, such as in front of a doorway (in front of an entrance) of a residence where the recipient lives or in front of a doorway of an office where the recipient works. At the delivery place, the article is transferred from the unmanned vehicle to the recipient.

Incidentally, in a case where the residence is a multifamily residential (for example, a condominium or an apartment building), the delivery place may be near a common doorway (entrance) of the multifamily residential. For example, in a case where the article is delivered by the UAV 2, the delivery place may be a take-off and landing port provided near a residence, an office, or the like. In this case, the article is transferred at the take-off and landing port. An operation panel operable by the recipient may be installed in the take-off and landing port. The operation panel performs short-range wireless communication (near field communication) with the UAV 2.

[1-1. Configuration and Function of UGV 1]

Figure 2:
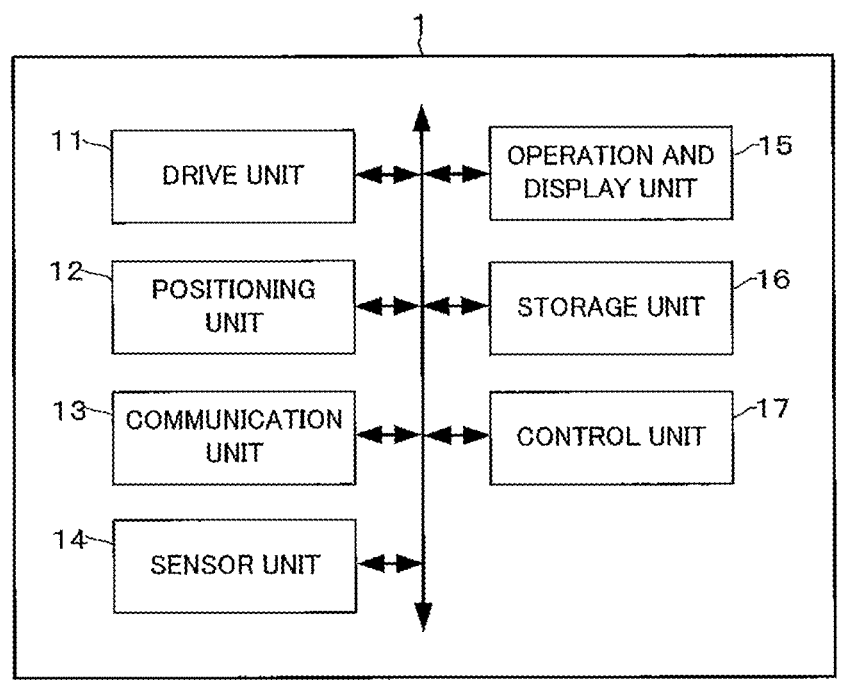
FIG. 2 is a diagram illustrating a schematic configuration example of an UGV 1.

Next, a configuration and a function of the UGV 1 will be described with reference to FIG. 2. FIG. 2 is a diagram illustrating a schematic configuration example of the UGV 1. As illustrated in FIG. 2, the UGV 1 includes a drive unit 11, a positioning unit 12, a communication unit 13, a sensor unit 14, an operation and display unit 15, a storage unit 16, a control unit 17, and the like. The UGV 1 includes a battery (not illustrated) that supplies power to each unit of the UGV 1, wheels W, a storage B for storing the article (designated article or alternative article) to be loaded, and the like. In the example of FIG. 1, a plurality of storages B are provided, and a door Do of the storage B at the lowermost stage at the center is opened, and a storage box C storing the article can be taken out. Incidentally, the UGV 1 may include a speaker that outputs sound.

The drive unit 11 includes a motor, a rotation shaft, and the like. The drive unit 11 rotates the plurality of wheels W by the motor, the rotation shaft, and the like that are driven in accordance with a control signal output from the control unit 17. The positioning unit 12 includes a radio wave receiver and the like. The positioning unit 12 receives, for example, a radio wave transmitted from a GNSS (Global Navigation Satellite System) satellite by the radio wave receiver, and detects a current position (latitude and longitude) of the UGV 1 based on the radio wave. Incidentally, the current position of the UGV 1 may be identified by SLAM (Simultaneous Localization and Mapping) processing in addition to the radio wave transmitted from the GNSS satellite. The current position of the UGV 1 may be corrected based on an image captured by a camera of the sensor unit 14. Positional information indicating the current position detected by the positioning unit 12 is output to the control unit 17.

The communication unit 13 controls communication performed via the communication network NW. Moreover, the communication unit 13 has a short-range wireless communication function such as Bluetooth (registered trademark), and may perform short-range wireless communication with a terminal (for example, a smartphone or the like) of the recipient. The sensor unit 14 includes an optical sensor such as a camera. For example, the optical sensor continuously performs sensing (for example, imaging) a real space within a range that falls within an angle of view of the camera. Sensing information obtained by the sensing of the sensor unit 14 is output to the control unit 17. The operation and display unit 15 includes a display (touch panel) Di having an input function of accepting an operation of the recipient and a display function of displaying information. The storage unit 16 includes a nonvolatile memory or the like, and stores various programs and data. Moreover, the storage unit 16 stores a vehicle ID of the UGV 1.

The control unit 17 includes at least one CPU (Central Processing Unit), a ROM Read Only Memory), a RAM (Random Access Memory), and the like, and executes various controls according to a program stored in the ROM (or storage unit 16). For example, the control unit 17 performs travel control such that the UGV 1 is to travel to the delivery destination. In this traveling control, the number of rotations of the wheels W and the position and a traveling direction of the UGV 1 are controlled by using the positional information acquired from the positioning unit 12, the sensing information acquired from the sensor unit 14, information on the delivery destination, and the like. As a result, the UGV 1 can autonomously move to the delivery destination. Incidentally, while the UGV 1 is traveling, the positional information of the UGV 1 and the vehicle ID of the UGV 1 are sequentially transmitted to the management server 3 by the communication unit 13.

Here, the delivery destination information may be set to the UGV 1 together with an article ID (that is, an article ID of the article to be delivered in accordance with the delivery destination information) at, for example, a loading base or may be set by being transmitted together with the article ID from the management server 3. The article ID is identification information for identifying the article. The delivery destination information includes, for example, a delivery destination ID of the delivery destination and location information of the delivery destination. The delivery destination ID is identification information for identifying the delivery destination. The location information of the delivery destination may be an address of the delivery destination or positional information (latitude and longitude) of the delivery destination. Incidentally, in a case where the article is delivered to each of a plurality of different delivery destinations, the delivery destination information is set for each delivery destination.

Moreover, the control unit 17 (a transfer control unit) performs control for transferring the article at the delivery destination. For example, in a case where the designated article is delivered, as the delivery target, to the delivery destination, and when input data for unlocking the door Do of the storage B (that is, releasing the lock of the door Do) is input from the display Di by the recipient, the input data is acquired by the control unit 17. Such input data may be code data including numbers and symbols, or may be biometric data such as fingerprints of the recipient.

And then, in a case where the input data is authenticated, the control unit 17 unlocks the door Do of the storage B storing the delivered designated article to open the door Do, and allows the storage box C to be taken out. The case where the input data is authenticated is, for example, a case where the input data coincides with preset authentication data. Incidentally, similarly to the delivery destination information, the authentication data (that is, the authentication data necessary for transferring the article) to be collated with the input data may be set to the UGV 1 together with the article ID and the like (for example, an article ID, a name, price, a maker, and an external appearance image) at the loading base, or may be set by being transmitted together with the article ID and the like from the management server 3 to the UGV 1. However, in a case there is no risk of theft or the like in the transfer (for example, in a case where the delivery destination is in a specific company), since the authentication of the input data is unnecessary, the authentication data may not be set.

On the other hand, in a case where the alternative article is delivered, as the delivery target, to the delivery destination, the control unit 17 (a presentation unit) presents the alternative article to the recipient in a selectable manner by displaying the alternative article on the display Di before or after the input of the input data for unlocking. Contents of the alternative article presented here may include, for example, a name, price, a maker, an external appearance image, and the like of the alternative article. Similarly to the delivery destination information, information on the contents of the alternative article indicating the contents of the alternative article may be set to the UGV 1 together with the article ID and the like at the loading base, or may be set by being transmitted together with the article ID and the like from the management server 3 to the UGV 1.

And then, in a case where the alternative article is selected from the display Di by the recipient and the input data is authenticated (for example, in a case where the input data is input and authenticated after the alternative article is selected), the control unit 17 acquires alternative article selection information (for example, including an article ID of the alternative article) indicating the selected alternative article, unlocks the door Do of the storage B storing the alternative article indicated by the alternative article selection information to open the door Do (that is, executes control for transferring the alternative article), and allows the storage box C to be taken out.

Moreover, in a case where short-range wireless communication is performed between the terminal of the recipient and the UGV 1, the control unit 17 may present the alternative article to the recipient in a selectable manner by transmitting alternative article content information indicating the contents of the alternative article loaded on the UGV 1 to the terminal. In this case, when the alternative article displayed on the display of the terminal is selected by the recipient and the input data is authenticated, the control unit 17 acquires the alternative article selection information indicating the selected alternative article from the terminal by short-range wireless communication, unlocks the door Do of the storage B storing the alternative article indicated by the alternative article selection information to open the door Do, and allows the storage box C to be taken out. Incidentally, the alternative article selection information is transmitted to the management server 3 together with, for example, the delivery destination ID of the delivery destination and the vehicle ID of the UGV 1 by the communication unit 13. The vehicle ID of the UGV 1 is identification information for identifying the UGV 1.

[1-2. Configuration and Function of UAV 2]

Figure 3:
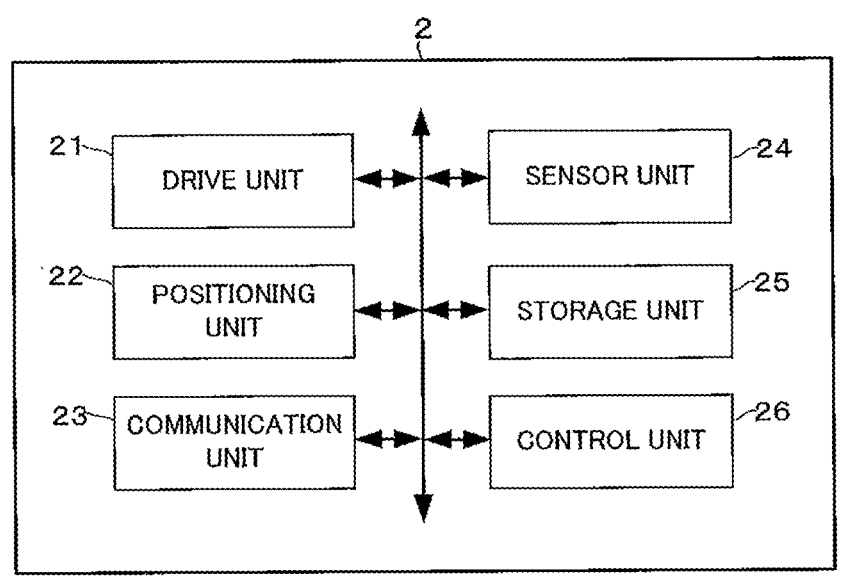
FIG. 3 is a diagram illustrating a schematic configuration example of an UAV 2.

Next, a configuration and a function of the UAV 2 will be described with reference to FIG. 3. FIG. 3 is a diagram illustrating a schematic configuration example of the UAV 2. As illustrated in FIG. 3, the UAV 2 includes a drive unit 21, a positioning unit 22, a communication unit 23, a sensor unit 24, a storage unit 25, a control unit 26, and the like. The UAV 2 includes a battery (not illustrated) that supplies power to each unit of the UAV 2, a rotor R (propeller) that is a horizontal rotary blade, a holding mechanism H for holding the article (designated article or alternative article), and the like. In the example of FIG. 1, the holding mechanism H holds a plurality of storage boxes C for storing articles.

Moreover, a plurality of separation suppressing units L that suppress (restrict) separation of the storage box C from the UAV 2 are provided in the holding mechanism H. The separation suppressing unit L includes an actuator (not illustrated) including a motor and the like, and a pin P that slides in a horizontal direction by the actuator. The pin P may enter an opened state and a closed state by sliding. For example, a ring (hook) F is fixed to an upper portion of the storage box C, and it is difficult to remove the ring F hooked on the pin P from the pin P in the closed state. On the other hand, when the pin P enters the opened state, the ring is removed from the pin P, and the storage box C can be separated from the UAV 2. Incidentally, the holding mechanism H may include a wire to which the separation suppressing unit L is connected, and a reel (winch) for unwinding or winding the wire.

The drive unit 21 includes a motor, a rotation shaft, and the like. The drive unit 21 rotates a plurality of rotors by the motor, the rotation shaft, and the like that are driven in accordance with a control signal output from the control unit 26. The positioning unit 22 includes a radio wave receiver, an altitude sensor, and the like. The positioning unit 22 receives, for example, a radio wave transmitted from a GNSS satellite by the radio wave receiver, and detects a current position (latitude and longitude) of the UAV 2 in the horizontal direction based on the radio wave. Incidentally, the current position of the UAV 2 in the horizontal direction may be corrected based on an image captured by a camera of the sensor unit 24. Positional information indicating the current position detected by the positioning unit 22 is output to the control unit 26. The positioning unit 22 may detect the current position (altitude) of the UAV 2 in a vertical direction by an altitude sensor such as an atmospheric pressure sensor. In this case, the positional information includes altitude information indicating the altitude of the UAV 2.

The communication unit 23 controls communication performed via the communication network NW. Moreover, the communication unit 23 has a short-range wireless communication function such as Bluetooth (registered trademark), and may perform short-range wireless communication with the terminal (for example, a smartphone or the like) of the recipient. The sensor unit 24 includes various sensors necessary for flight control of the UAV 2. The various sensors include, for example, an optical sensor, a triaxial angular velocity sensor, a triaxial acceleration sensor, and a geomagnetic sensor. The optical sensor includes, for example, a camera. For example, the optical sensor continuously performs sensing (for example, imaging) a real space within a range that falls within an angle of view of the camera. The sensing information obtained by the sensing of the sensor unit 24 is output to the control unit 26. Moreover, the storage unit 25 includes a nonvolatile memory or the like, and stores various programs and data. The storage unit 25 stores a vehicle ID for identifying the UAV 2.

The control unit 26 includes at least one CPU, a ROM, a RAM, and the like, and executes various controls according to a program stored in the ROM (or storage unit 25). For example, the control unit 26 performs flight control to cause the UAV 2 to fly to the delivery destination. In this flight control, the number of rotations of the rotor R and the position, the attitude, and a traveling direction of the UAV 2 are controlled by using the positional information acquired from the positioning unit 22, the sensing information acquired from the sensor unit 24, the delivery destination information, and the like. As a result, the UAV 2 can autonomously move to the delivery destination. Incidentally, during the flight of the UAV 2, the positional information of the UAV 2 and the vehicle ID of the UAV 2 are sequentially transmitted to the management server 3 by the communication unit 23. Moreover, similarly to the UGV 1, for example, the delivery destination information may be set to the UAV 2 together with the article ID and the like at the loading base, or may be set by being transmitted together with the article ID and the like from the management server 3.

Moreover, the control unit 26 (a transfer control unit) performs control for transferring the article at the delivery destination. Such control may be performed in a state where the UAV 2 is landing or in a state where the UAV 2 is hovering. For example, in a case where the designated article is delivered, as the delivery target, to the delivery destination and the transfer is performed in a state where the UAV 2 lands on the take-off and landing port having the operation panel at the delivery destination, and when the input data for unlocking the pin P of the separation suppressing unit L (that is, releasing the lock of the pin P) is input from the operation panel by the recipient, the input data is acquired by the control unit 26 by being transmitted to the UAV 2 by short-range wireless communication.

And then, in a case where the input data is authenticated, the control unit 26 unlocks the pin P of the separation suppressing unit L holding the delivered designated article to remove the pin P from the ring of the storage box C, and allows the storage box C to be separated. Incidentally, similarly to the delivery destination information, the authentication data (that is, the authentication data necessary for transferring the article) collated with the input data may be set to the UAV 2 together with the article ID and the like at the loading base, or may be set by being transmitted to the UAV 2 together with the article ID and the like from the management server 3. However, in a case there is no risk of theft or the like in the transfer (for example, in a case where the delivery destination is in a specific company), since the authentication of the input data is unnecessary, the authentication data may not be set.

On the other hand, in a case where the alternative article is delivered, as the delivery target, to the delivery destination, the control unit 26 (a presentation unit) presents the alternative article to the recipient in a selectable manner by displaying the alternative article on the operation panel by short-range wireless communication before or after the input of the input data for unlocking. Contents of the alternative article presented here may include, for example, a name, price, a maker, an external appearance image, and the like of the alternative article. Similarly to the delivery destination information, the alternative article content information indicating the contents of the alternative article may be set to the UAV 2 together with the article ID and the like at the loading base, or may be set by being transmitted to the UAV 2 together with the article ID and the like from the management server 3.

And then, in a case where the alternative article is selected from the operation panel by the recipient and the input data is authenticated (for example, in a case where the input data is input and authenticated after the alternative article is selected), the control unit 26 acquires the alternative article selection information (for example, including the article ID of the alternative article) indicating the selected alternative article, unlocks the pin P of the separation suppressing unit L holding the alternative article indicated by the alternative article selection information to remove the pin P from the ring of the storage box C (that is, executes the control for transferring the alternative article), and allows the storage box C to be separated. Incidentally, in a case where the control for transferring is performed in a state where the UAV 2 is hovering, the control unit 26 sends out the wire to which the separation suppressing unit L is connected by the reel, unlocks the pin P of the separation suppressing unit L to remove the pin P from the ring of the storage box C when the storage box C is grounded, and allows the storage box C to be separated.

Moreover, in a case where short-range wireless communication is performed between the terminal of the recipient and the UAV 2, the control unit 26 may present the alternative article to the recipient in a selectable manner by transmitting, to the terminal, the alternative article content information indicating the contents of the alternative article loaded on the UAV 2 in a state of landing or hovering. In this case, when the alternative article displayed on the display of the terminal is selected by the recipient and the input data is authenticated, the control unit 26 acquires the alternative article selection information indicating the selected alternative article from the terminal by short-range wireless communication, unlocks the pin P of the separation suppressing unit L holding the alternative article indicated by the alternative article selection information to remove the pin P from the ring of the storage box C, and allows the storage box C to be separated. Incidentally, for example, the alternative article selection information is transmitted to the management server 3 together with the delivery destination ID of the delivery destination and the vehicle ID of the UAV 2 by the communication unit 23. The vehicle ID of the UAV 2 is identification information for identifying the UAV 2.

[1-3. Configuration and Function of Management Server 3]

Figure 4:
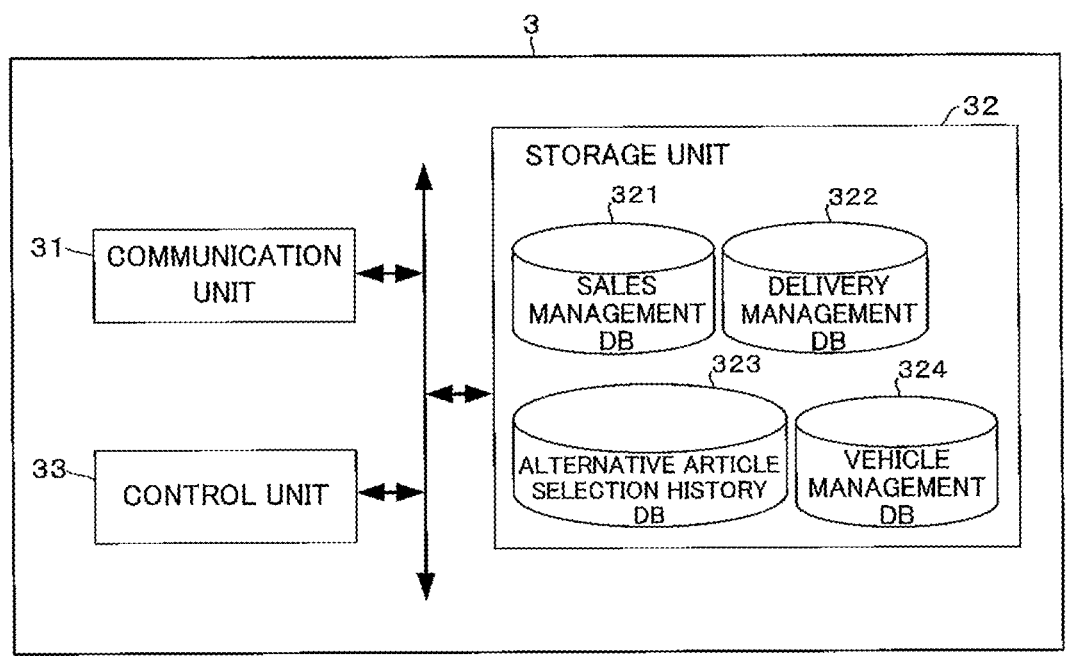
FIG. 4 is a diagram illustrating a schematic configuration example of a management server 3.

Next, a configuration and a function of the management server 3 will be described with reference to FIGS. 4 and 5. FIG. 4 is a diagram illustrating a schematic configuration example of the management server 3. As illustrated in FIG. 4, the management server 3 includes a communication unit 31, a storage unit 32, a control unit 33, and the like. The communication unit 31 controls communication performed via the communication network NW. The positional information and the vehicle ID transmitted from the UGV 1 are received by the communication unit 31. The management server 3 can recognize the current position of the UGV 1 from the positional information of the UGV 1. Moreover, the positional information and the vehicle ID transmitted from the UAV 2 are received by the communication unit 31. The management server 3 can recognize the current position of the UAV 2 from the positional information of the UAV 2. The storage unit 32 includes, for example, a hard disk drive or the like, and stores various programs and data. Moreover, in the storage unit 32, a sales management database (DB) 321, a delivery management database (DB) 322, an alternative article selection history database (DB) 323, a vehicle management database 324, and the like are constructed.

The sales management database 321 is a database for storing information on articles (items) handled in the real store such as a supermarket and the EC site such as the online supermarket. In the sales management database 321, for example, an article ID, a name, a feature, a stock quantity, a type (category), a maker, specifications, price, an external appearance image, alternative article setting information, and the like of the article are stored in association with each other for each article. Here, the stock quantity of the article is a common stock quantity between the real store and the EC site. When the payment for the article is completed in the real store or the EC site, the stock quantity decreases by the number of ordered (purchased) articles. The types of the articles may be represented hierarchically from a higher hierarchy to a lower hierarchy. The type of the higher hierarchy includes, for example, beverages, foods, daily necessities, and medicines. Examples of the type of the lower hierarchy of the beverage include Japanese tea, black tea, coffee, and orange juice. The specifications of the article vary depending on the type of the article, but for example, in the case of the beverages, the specifications include a raw material, an ingredient, a content amount, and the like.

The alternative article setting information includes, for example, the article ID of the alternative article for the article, relevance degree information indicating a degree of relevance between the article and the alternative article (indicating a degree of relevance for each of the plurality of alternative articles), and the like. Here, one or more alternative articles for the article are set for the article. Moreover, as long as the types of the articles are the same, the alternative articles of the article may not necessarily have the same price as the article, and may not necessarily have the same specifications as the article. Moreover, for example, for one 1l-bottle of tea (135 yen/1 bottle), two 500-ml bottles of tea (70 yen/1 bottle) may be the alternative article. Incidentally, the degree of relevance is set to be higher for the alternative article of the same type as the article and closer to the specifications and price of the article.

The delivery management database 322 is a database for storing information on the delivery of the designated article. As described above, the designated article is an article designated as the delivery target for the delivery destination. More specifically, the designated article can be an article designated (specified) as an order target by the user related to the delivery destination on the EC site and subjected to a delivery procedure. In such a delivery procedure, the delivery destination information, delivery requester information, and recipient information are obtained. Incidentally, a payment procedure may be performed together with the delivery procedure, and the payment for the designated article may be completed. In the delivery management database 322, for example, the article ID, the delivery destination information, a delivery timetable (schedule), loading information, the delivery requester information, the recipient information, vehicle information, and the like of the designated article are stored in association with each other for each delivery destination.

Here, the loading information of the designated article includes a stockout flag (True or False) of the designated article. When the designated article is loaded on the unmanned vehicle, the stockout flag is "False". In a case where the stockout flag is "False", the loading information further includes authentication data necessary for transferring the designated article. On the other hand, in a case where the designated article is not loaded on the unmanned vehicle and the alternative article is loaded instead of the designated article, the stockout flag is "True". In a case where the stockout flag is "True", the loading information further includes the article ID of the alternative article and the authentication data necessary for transferring the alternative article. The delivery requester information includes a user ID, a mail address, and the like of the delivery requester. The recipient information includes a user ID, a mail address, and the like of the recipient. The user ID is identification information for identifying the user in the commerce system. The vehicle information includes the vehicle ID of the unmanned vehicle on which the article (designated article or alternative article) is loaded.

The alternative article selection history database 323 is a database for storing history information indicating the number of times or frequency (counting result) that the alternative article for the designated article has been selected in the past by one or a plurality of users for each designated article and for each alternative article. In the alternative article selection history database 323, for example, the article ID of the designated article, the number of times or frequency that the alternative article has been selected for the designated article, and the like are stored in association with each other for each designated article.

The vehicle management database 324 is a database for storing information on the unmanned vehicle. In the vehicle management database 324, the airframe ID of the unmanned vehicle, the type (UGV or UAV) of the unmanned vehicle, the positional information indicating the current position of the unmanned vehicle, a delivery schedule (for example, a delivery route and a delivery timetable) of the unmanned vehicle, a loading status of the unmanned vehicle, address information for accessing the unmanned vehicle, and the like in association with each other for each unmanned vehicle. Here, the loading status of the unmanned vehicle includes the article ID of the article (designated article or alternative article) loaded on the unmanned vehicle, and information such as a size of the article and the number of articles that can be loaded from now. Incidentally, the positional information of the unmanned vehicle is updated whenever the positional information is received by the communication unit 31 from the unmanned vehicle.

The control unit 33 includes at least one CPU (an example of processor), a ROM, a RAM, and the like, and executes various kinds of processing according to a program stored in the ROM (alternatively, a non-volatile memory may be used) or the storage unit 32. The ROM or the storage unit 32 is configured to store a program (program code). The CPU is configured to access the program code and operate as instructed by the program code. The program code includes: acquisition code configured to cause the CPU to acquire alternative article selection information indicating an alternative article selected by a user related to the delivery destination from among the one or more alternative articles after the unmanned vehicle starts moving toward the delivery destination; and transfer control code configured to cause the CPU to perform control for transferring the alternative article indicated by the alternative article selection information at the delivery destination. Further, the program code may include presentation code configured to cause the CPU to present the alternative articles loaded on the unmanned vehicle to the user in a selectable manner. Further, the program code may include movement control code configured to cause the CPU to, when the different alternative article is selected by the user, move the unmanned vehicle or a different unmanned vehicle toward the delivery destination, the unmanned vehicle or the different unmanned vehicle having the different alternative article. Further, the program code may include notifying code configured to cause the CPU to notify the user of the alternative article before or after the unmanned vehicle starts moving toward the delivery destination; and acceptance code configured to cause the CPU to accept cancellation of designation of the article.

Further, the program code may include movement control code configured to cause the CPU to, when the cancellation is accepted after the unmanned vehicle starts moving toward the delivery destination, stop the movement, and move the unmanned vehicle toward a predetermined base or a different delivery destination. Further, the program code may include setting code configured to cause the CPU to preferentially set, as an alternative article to be loaded on the unmanned vehicle, an alternative article having a relatively high degree of relevance among a plurality of the alternative articles, on a basis of relevance degree information indicating a degree of relevance between the article and the alternative article for each the plurality of alternative articles. Further, the program code may include setting code configured to cause the CPU to preferentially set, as an alternative article to be loaded on the unmanned vehicle, an alternative article having a relatively high number of times or a relatively high frequency among a plurality of the alternative articles, on a basis of history information indicating the number of times or frequency that the alternative article has been selected in the past as the alternative article for the article for each the plurality of alternative articles. Further, the program code may include processing code configured to cause the CPU to, when there is a difference in price between the item and the alternative article selected by the user, perform processing of eliminating the difference before the control for transferring the alternative article is performed.

Figure 5:
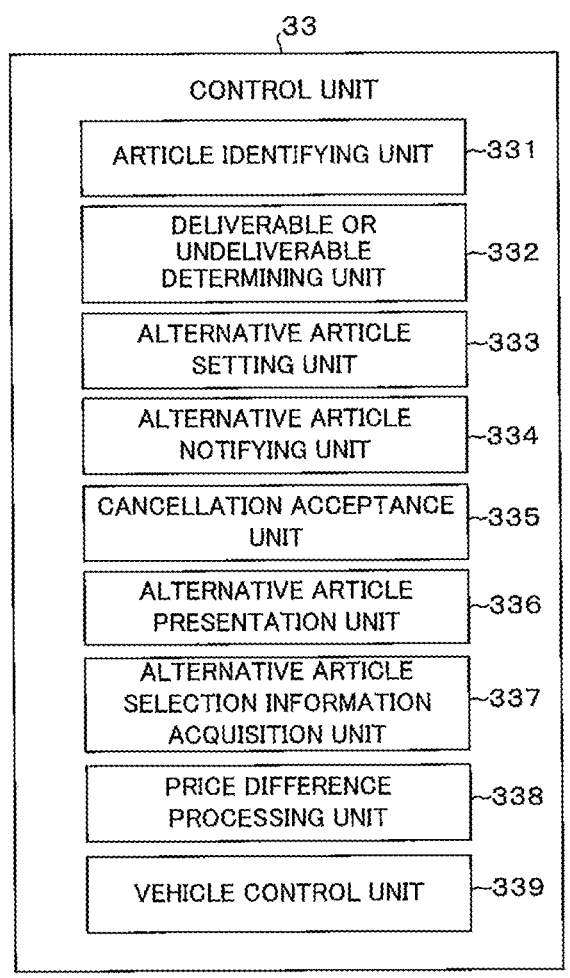
FIG. 5 is a diagram illustrating an example of functional blocks in a control unit 33.

FIG. 5 is a diagram illustrating an example of functional blocks in the control unit 33. By executing the program, as illustrated in FIG. 5, the control unit 33 functions as an article identifying unit 331, a deliverable or undeliverable determining unit 332, an alternative article setting unit 333, an alternative article notifying unit 334, a cancellation acceptance unit 335, an alternative article presentation unit 336, an alternative article selection information acquisition unit 337, a price difference processing unit 338, a vehicle control unit 339, and the like in accordance with the program code stored in, for example, the ROM or the storage unit 32.

The article identifying unit 331 identifies, as the designated article, the article designated as the delivery target. For example, the article identifying unit 331 identifies the designated article by acquiring the article ID, the delivery destination information, the delivery requester information, and the recipient information of the designated article designated as the order target by the user related to the delivery destination on the EC site and subjected to the delivery procedure from the commerce system. At this time, the delivery timetable of the identified designated article is determined, and the unmanned vehicle (UGV 1 or UAV 2) for delivering the designated article is selected.

The deliverable or undeliverable determining unit 332 determines whether or not the designated article identified by the article identifying unit 331 is deliverable. For example, the deliverable or undeliverable determining unit 332 notifies a staff of a stock confirmation request for the designated article identified by the article identifying unit 331. Information indicating the stock confirmation request including the article ID and the name of the designated article and a required number designated by the user related to the delivery destination may be transmitted to a terminal of the staff. As a result, the staff confirms the stock of the designated article from an article display shelf, for example, and returns a stock confirmation result from the terminal to the management server 3. In a case where the stock confirmation result returned from the terminal indicates that the article is in stock, the deliverable or undeliverable determining unit 332 determines that the designated article is deliverable. In this case, the designated article identified by the article identifying unit 331 is loaded, as the delivery target for the delivery destination, on the unmanned vehicle.

On the other hand, in a case where the stock confirmation result returned from the terminal indicates that the article is not in stock (that is, in a case where the stock quantity of the designated article is less than a required number designated by the user related to the delivery destination), the deliverable or undeliverable determining unit 332 determines that the designated article is undeliverable. Here, the designated article determined to be undeliverable is an article found to be undeliverable after being designated as the delivery target. For example, in a state where the article is taken out of the article display shelf and is put in a shopping basket by a store visitor in the real store, since the article is designated as the designated article and ordered by the user on the EC site (that is, the article is managed as being in stock in the sales management database 321 and is ordered) but there is no designated article in the article display shelf, it is found that the designated article is not undeliverable at a point in time of stock confirmation. In this case, the alternative article for the designated article identified by the article identifying unit 331 is loaded, as the delivery target for the delivery destination, on the unmanned vehicle. Incidentally, the designated article put in the shopping basket of the store visitor may be paid, or the designated article may be returned to the article display shelf without being paid. Moreover, the determination as to whether or not the designated article is deliverable may be artificially performed.

The alternative article setting unit 333 sets one or more alternative articles for the article managed in the sales management database 321. For example, the alternative article set for the article may be selected from among the articles in stock as much as the designated required number on the basis of the type, the specifications, the price, and the like of the article among the articles managed by the sales management database 321. Thus, the alternative article for the designated article found to be undeliverable by the determination of the deliverable or undeliverable determining unit 332 may be searched for from the sales management database 321 and set. However, before the determination of the deliverable or undeliverable determining unit 332, the alternative article setting unit 333 may set a plurality of alternative articles in advance for each article managed in the sales management database 321. And then, the alternative article setting unit 333 may set (reset), as the alternative article to be loaded on the unmanned vehicle, one or more alternative articles in stock as much as the designated required number among a plurality of alternative articles set in advance for the designated article found to be undeliverable. As a result, the alternative article can be quickly set. Moreover, similarly to the designated article, in a case where the alternative article is set, the deliverable or undeliverable determining unit 332 may determine whether or not the article is deliverable, and then may set the article determined to be deliverable as the alternative article.

Moreover, the alternative article setting unit 333 may acquire, from the sales management database 321, relevance degree information indicating a degree of relevance between the designated article found to be undeliverable and the alternative article for each of the plurality of alternative articles. And then, the alternative article setting unit 333 may preferentially set, as the alternative article to be loaded on the unmanned vehicle, the alternative article having a relatively high degree of relevance among the plurality of alternative articles set in advance for the designated article found to be undeliverable and among the alternative articles in stock as much as the required number, on the basis of the relevance degree information. As a result, it is possible to preferentially load, on the unmanned vehicle, the alternative article likely to be selected by the user related to the delivery destination.

Alternatively, the alternative article setting unit 333 may acquire, from the alternative article selection history database 323, history information indicating the number of times or frequency that the alternative article for the designated article found to be undeliverable has been selected in the past by one or a plurality of users for each of the plurality of alternative articles. And then, the alternative article setting unit 333 may preferentially set, as the alternative article to be loaded onto the unmanned vehicle, the alternative article having a relatively high number of selected times or frequency among the plurality of alternative articles set in advance for the designated article found to be undeliverable and among the alternative articles in stock as much as the required number, on the basis of the history information. As a result, it is possible to preferentially load, on the unmanned vehicle, the alternative article likely to be selected by the user related to the delivery destination.

The alternative article notifying unit 334 notifies the user related to the delivery destination of the alternative article before or after the unmanned vehicle having the alternative article set by the alternative article setting unit 333 loaded thereon starts moving toward the delivery destination. For example, the alternative article notifying unit 334 notifies the user of the alternative article by transmitting an e-mail describing URL (Uniform Resource Locator) or the like for accessing the alternative article content information indicating the contents of the alternative article to the mail address of the user related to the delivery destination.

The cancellation acceptance unit 335 can accept cancellation of the designation of the designated article. For example, when the user who accepts the notification of the alternative article for the designated article performs a cancellation procedure for the designated article designated as the order target on the EC site, cancellation information indicating the cancellation (order cancellation) of the designation of the designated article is transmitted from the commerce system to the management server 3. The cancellation acceptance unit 335 accepts the cancellation of the designation of the designated article by receiving the cancellation information.

Before or after the unmanned vehicle having the alternative article set by the alternative article setting unit 333 loaded thereon starts moving toward the delivery destination, the alternative article presentation unit 336 presents the loaded alternative article to the user related to the delivery destination in a selectable manner. For example, the alternative article presentation unit 336 presents the alternative article to the user in a selectable manner by transmitting the alternative article content information to the terminal of the user which accesses the alternative article content information indicating the contents of one or a plurality of alternative articles through the URL for accessing the alternative article content information. Alternatively, the alternative article presentation unit 336 may present the alternative article to the user in a selectable manner by transmitting (push distributing) the alternative article content information to an application resident in the terminal of the user.

After the unmanned vehicle having the alternative article loaded thereon starts moving toward the delivery destination, the alternative article selection information acquisition unit 337 acquires the alternative article selection information indicating the alternative article selected by the user from among the alternative articles presented to the user together with the delivery destination ID of the delivery destination of the alternative article by the unmanned vehicle or the alternative article presentation unit 336. However, in a case where the alternative article selection information is not acquired by the alternative article selection information acquisition unit 337 even after a predetermined time elapses since the unmanned vehicle arrives at the delivery destination (that is, in a case where the user does not select the alternative article from among the presented alternative articles), for example, the alternative article presentation unit 336 may present, to the user, different (other) alternative articles not loaded on the unmanned vehicle stopped at the delivery destination. As a result, it is possible to expand a range of the alternative articles selectable by the user related to the delivery destination.

For example, the alternative article setting unit 333 resets different alternative articles that are not yet presented to the user among the plurality of alternative articles set for the designated article found to be undeliverable. And then, the alternative article presentation unit 336 presents the different alternative articles to the user in a selectable manner by transmitting different alternative article content information indicating contents of the reset different alternative articles to the terminal of the user via the communication network NW. And then, the alternative article selection information acquisition unit 337 acquires different alternative article selection information indicating the different alternative article selected by the user from among the presented different alternative articles. Incidentally, the different alternative article may be re-delivered by the unmanned vehicle stopped at the delivery destination, or may be delivered by a different unmanned vehicle other than the unmanned vehicle. Moreover, the alternative article presentation unit 336 may present, to the user, a required time for the unmanned vehicle having the different alternative article loaded thereon to arrive at the delivery destination together with the different alternative article.

In a case where the payment for the designated article corresponding to the alternative article indicated by the alternative article selection information acquired by the alternative article selection information acquisition unit 337 is completed and there is a difference in price between the designated article and the alternative article, the price difference processing unit 338 performs processing of eliminating the difference (price difference) before control for transferring the alternative article is performed. As a result, it is possible to cause the user related to the delivery destination to quickly select even the alternative article having a price difference from the designated article for which payment is completed. For example, in a case where the price of the alternative article is lower than the price of the designated article, the price difference processing unit 338 performs processing for refunding the price difference to the user. In such processing, a refund request including the user ID of the user and the price difference is transmitted to the commerce system. On the other hand, in a case where the price of the alternative article is higher than the price of the designated article, the price difference processing unit 338 performs processing for additionally charging the user the price difference. In such processing, additional charging including the user ID of the user and the price difference is transmitted to the commerce system. Incidentally, the price difference processing unit 338 may request the commerce system to perform the cancellation procedure for the designated article and the payment procedure for the alternative article for the designated article.

The vehicle control unit 339 controls an operation of the unmanned vehicle by transmitting a control command to the unmanned vehicle via the communication network NW. For example, after the unmanned vehicle starts moving toward the delivery destination, when the cancellation of the designation of the designated article is accepted by the cancellation acceptance unit 335, the vehicle control unit 339 stops the movement of the unmanned vehicle by transmitting a delivery stop control command to the unmanned vehicle via the communication network NW, and moves the unmanned vehicle toward a predetermined base (for example, a loading base or a transit base) or a different delivery destination.

Moreover, as described above, in a case where the different alternative article selection information indicating the different alternative article selected by the user related to the delivery destination is acquired by the alternative article selection information acquisition unit 337, the vehicle control unit 339 may cause the unmanned vehicle to deliver the different alternative article by transmitting a delivery control command to the unmanned vehicle stopped at the delivery destination or a different unmanned vehicle other than the unmanned vehicle via the communication network NW. For example, the vehicle control unit 339 causes the unmanned vehicle stopped at the delivery destination to move (for example, return) to the loading base having the different alternative article, and causes the unmanned vehicle to load the different alternative article at the loading base and move (that is, re-delivery) toward the delivery destination. Alternatively, the vehicle control unit 339 may cause a different unmanned vehicle on standby at the loading base having the different alternative article to load the different alternative article and move toward the delivery destination. Alternatively, the vehicle control unit 339 may cause a different unmanned vehicle that has the different alternative article loaded thereon and is on the move to move toward the delivery destination.

[2. Operation of Article Delivery System S]

Figure 6:
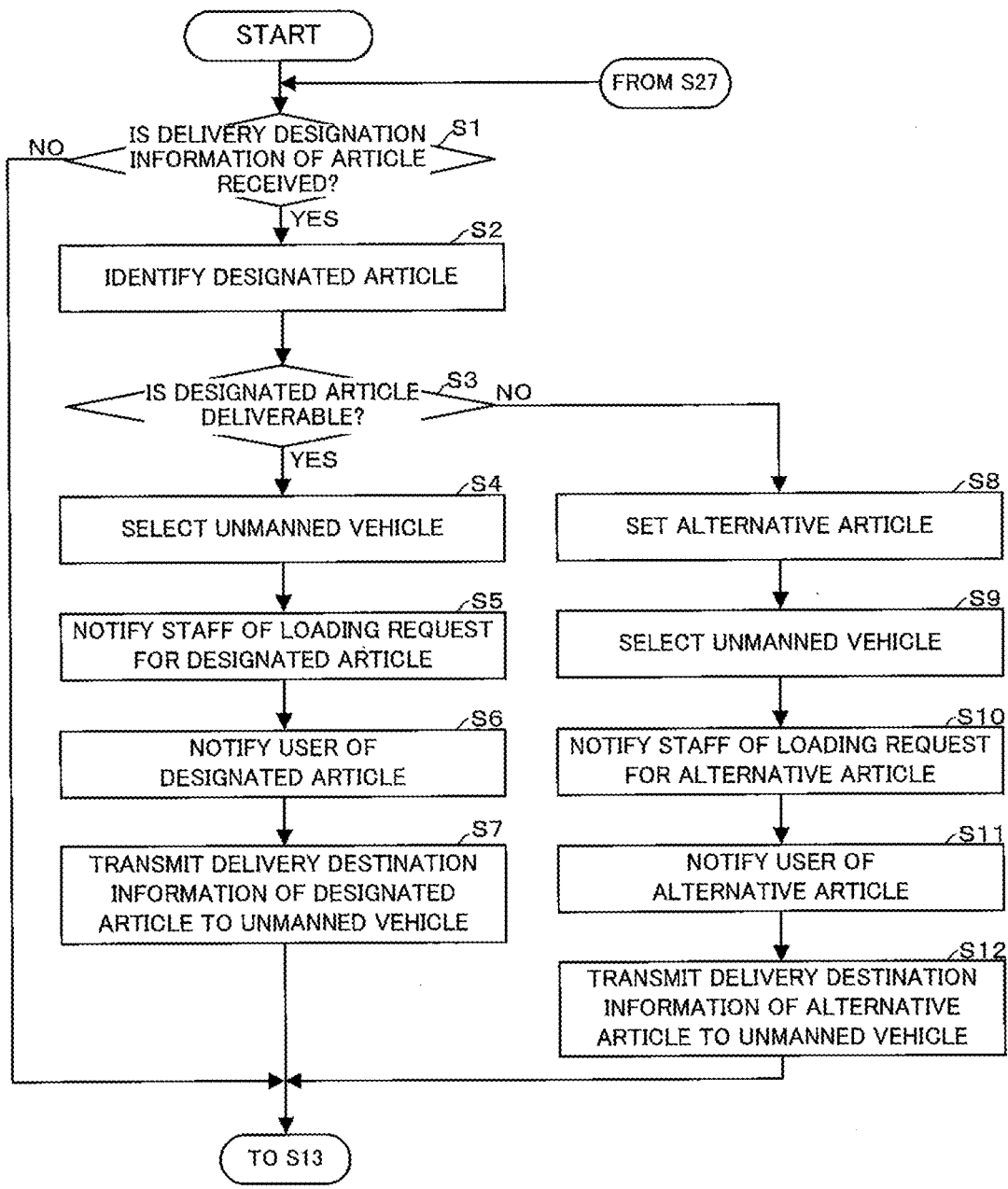
FIG. 6 is a flowchart illustrating an example of processing of the management server 3 in an article delivery.
Figure 7:
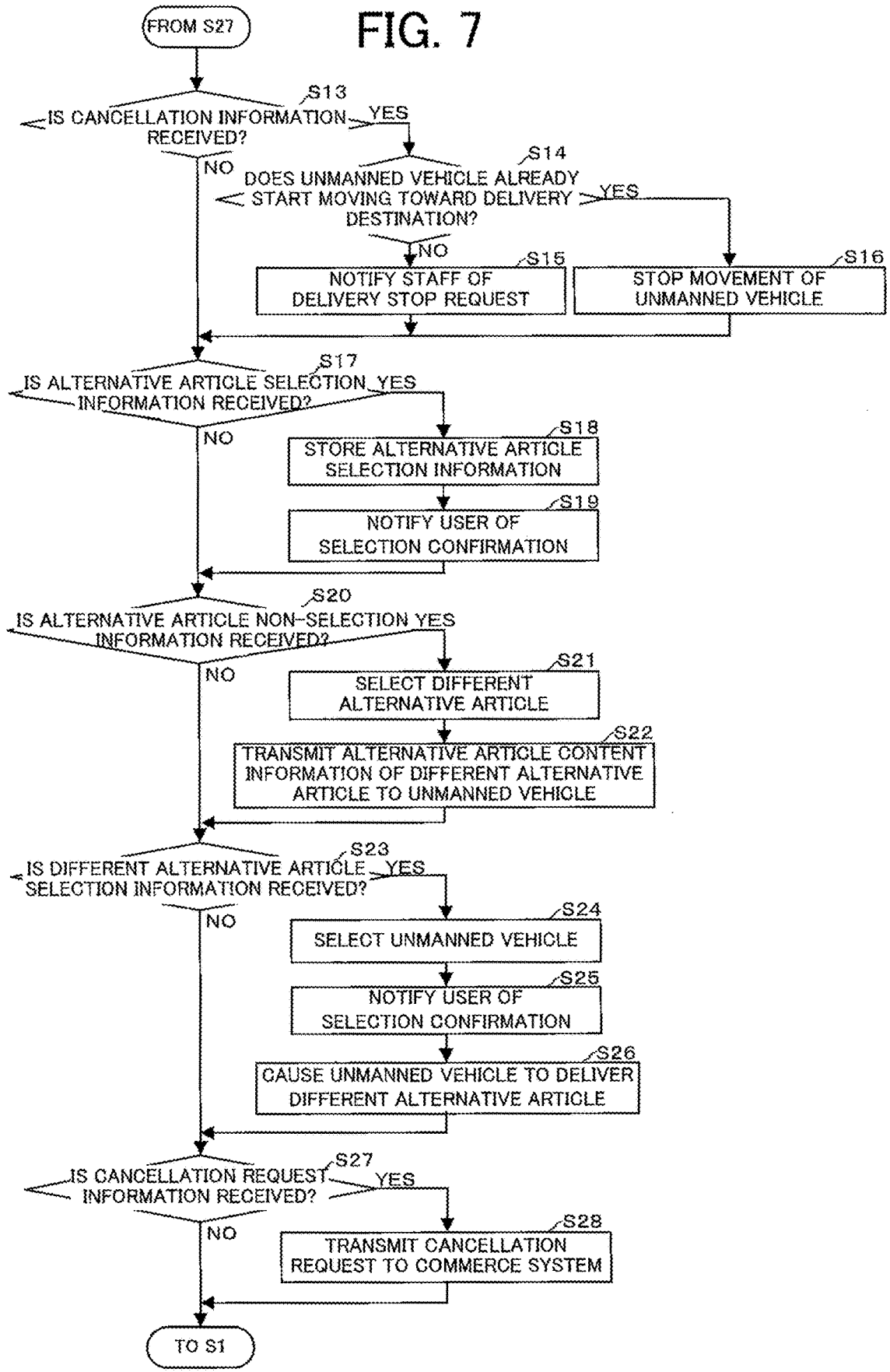
FIG. 7 is a flowchart illustrating an example of processing of the management server 3 in the article delivery.
Figure 8:
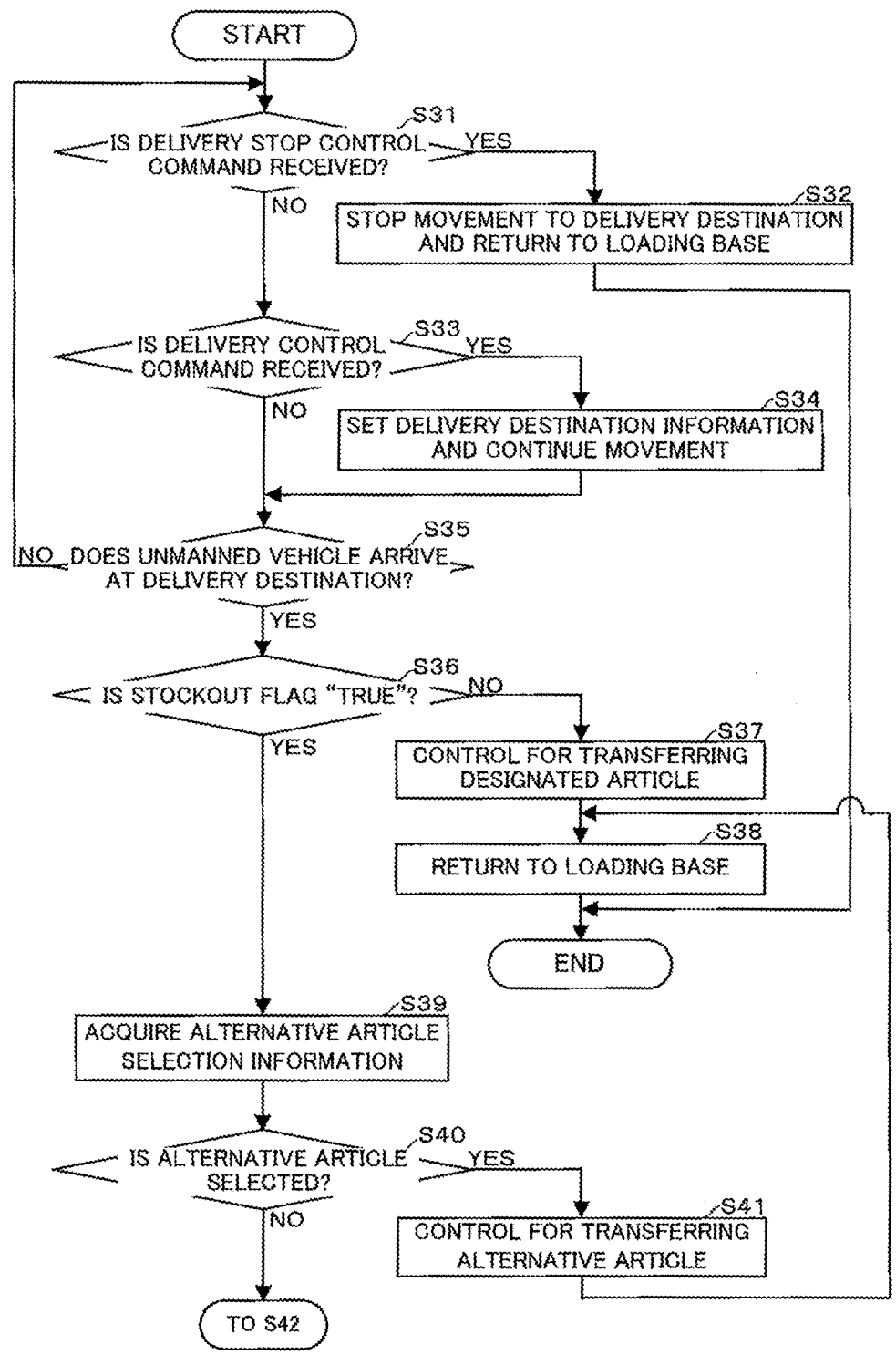
FIG. 8 is a flowchart illustrating an example of processing of the unmanned vehicle in the article delivery.
Figure 9:
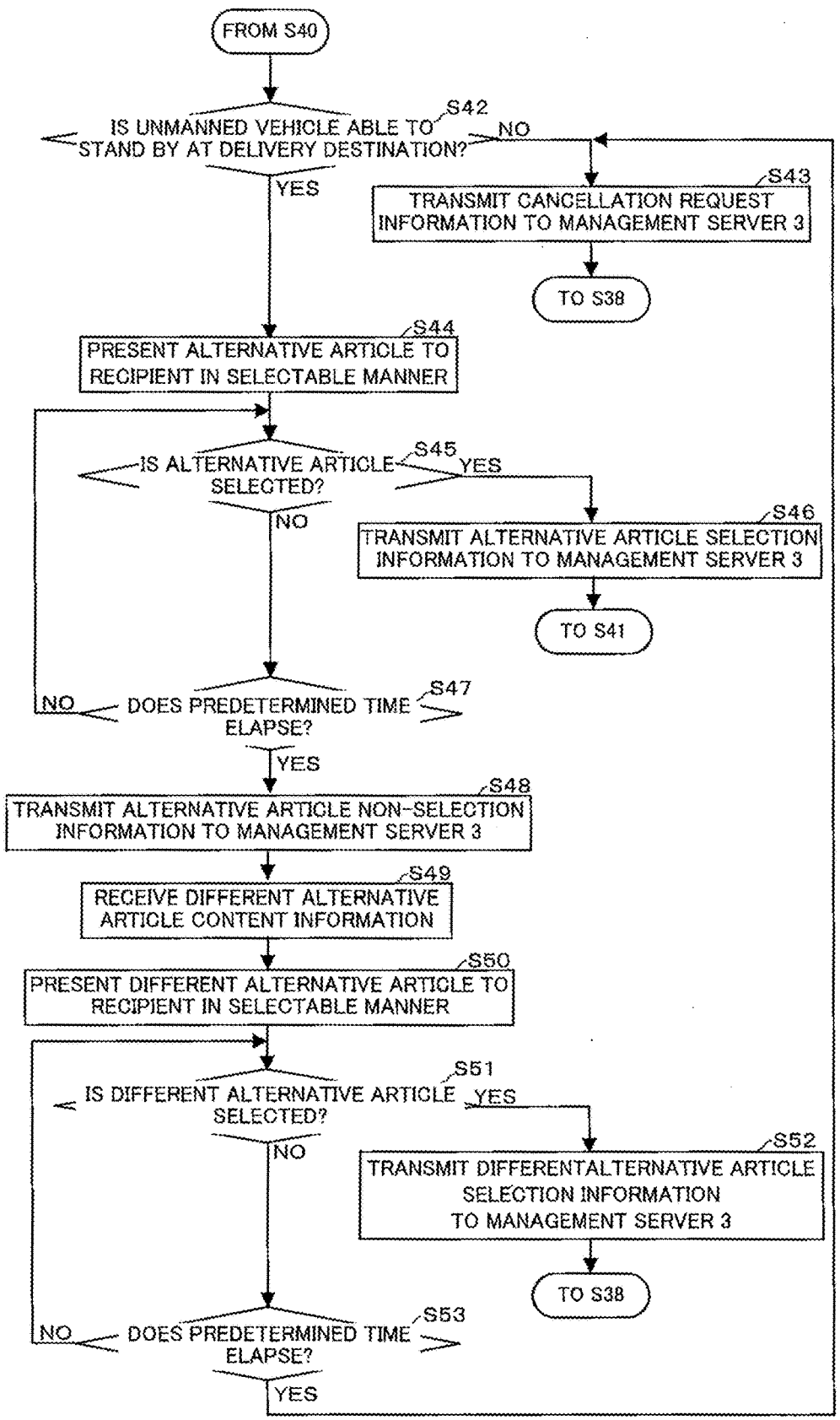
FIG. 9 is a flowchart illustrating an example of processing of the unmanned vehicle in the article delivery.

Next, an operation of the article delivery system S will be described with reference to FIGS. 6 to 9 and the like. FIGS. 6 and 7 are flowcharts illustrating an example of processing of the management server 3 in the article delivery. The processing illustrated in FIGS. 6 and 7 is executed by the control unit 33 of the management server 3. Incidentally, the processing illustrated in FIGS. 6 and 7 is executed except for maintenance when the management server 3 is being activated. FIGS. 8 and 9 are flowcharts illustrating an example of processing of the unmanned vehicle in the article delivery. The processing illustrated in FIGS. 8 and 9 is executed by the control unit 17 of the UGV 1 or the control unit 26 of the UAV 2.

[2.1. Processing of Management Server 3]

First, the processing of the management server 3 in the article delivery will be described. In the processing illustrated in FIG. 6, the management server 3 determines whether or not delivery designation information of the article designated as the order target by the user related to the delivery destination on the EC site and subjected to the delivery procedure is received from the commerce system (step S1). When it is determined that the delivery designation information of the article is not received (step S1: NO), the processing proceeds to step S13 illustrated in FIG. 7. On the other hand, when it is determined that the delivery designation information of the article is received (step S1: YES), the delivery designation information of the article is acquired, and the processing proceeds to step S2. Incidentally, the delivery designation information of the article includes, for example, the article ID, the delivery destination information, the delivery timetable, the delivery requester information, and the recipient information of the article.

In step S2, the management server 3 identifies, as the designated article, the article designated as the delivery target by the article identifying unit 331 on the basis of the article ID acquired in step S1. Subsequently, the management server 3 determines whether or not the designated article identified in step S2 is deliverable by the deliverable or undeliverable determining unit 332 (step S3). When it is determined that the designated article is deliverable (step S3: YES), the processing proceeds to step S4. On the other hand, when it is determined that the designated article is undeliverable (step S3: NO), the processing proceeds to step S8.

In step S4, the management server 3 selects the unmanned vehicle for delivering the designated article identified in step S2 on the basis of the delivery timetable acquired in step S1 and the delivery schedule and the loading status of the unmanned vehicle managed in the vehicle management database 324. Subsequently, the management server 3 notifies the staff at the loading base of a loading request for the designated article identified in step S2 (step S5). For example, information indicating the loading request for the designated article may be transmitted to the terminal of the staff. As a result, the staff picks and packages the designated article, and loads the designated article on the unmanned vehicle selected in step S4.

Incidentally, when the loading of the designated article on the unmanned vehicle is completed, information on the delivery of the designated articles identified in step S2 is registered in the delivery management database 322. The information on the delivery of the designated article includes the delivery designation information acquired in step S1, the loading information of the designated article, and the vehicle information of the unmanned vehicle selected in step S4. Here, the loading information of the designated article includes the stockout flag "False" and the authentication data necessary for transferring the designated article. The authentication data may be issued by the management server 3 at the time of registration.

Subsequently, the management server 3 notifies the user related to the delivery destination of the designated article identified in step S2 (step S6). For example, the e-mail describing the contents (for example, the name, the price, and the like) of the designated article, the authentication data necessary for transferring the designated article, and the like may be transmitted to the mail address of the user.

Subsequently, the management server 3 transmits the article ID, the delivery destination information, the delivery timetable, and the loading information of the designated article identified in step S2, the authentication data necessary for transferring the designated article, and the like to the unmanned vehicle selected in step S4 (step S7), and the processing proceeds to step S14 illustrated in FIG. 7. As a result, the article ID, the delivery destination information, the delivery timetable, the loading information, and the authentication data of the designated article are set to the unmanned vehicle. And then, the unmanned vehicle starts moving toward the delivery destination according to the delivery destination information and the delivery timetable. Incidentally, the notification (notification in step S6) of the designated article identified in step S2 may be performed after the unmanned vehicle starts moving toward the delivery destination.

On the other hand, in step S8, the management server 3 sets, as the alternative article for the designated article identified in step S2, the article in stock (that is, the article other than the designated article identified in step S2) among the articles managed in the sales management database 321, by the alternative article setting unit 333. For example, as described above, the alternative article for the designated article may be set based on at least one information of the relevance degree information indicating the degree of relevance between the designated article and the alternative article for each of the plurality of alternative articles and the history information indicating the number of times or frequency that the alternative article for the designated article has been selected in the past by one or the plurality of users for each of the plurality of alternative articles. Here, in the case of the number of times or frequency that the alternative article for the designated article has been selected in the past by one user, the one user may be a user (user related to the delivery destination) who designates the designated article this time.

Subsequently, the management server 3 selects the unmanned vehicle for delivering the alternative article set in step S8, on the basis of the delivery timetable acquired in step S1 and the delivery schedule and the loading status of the unmanned vehicle managed in the vehicle management database 324 (step S9). Subsequently, the management server 3 notifies the staff at the loading base of the loading request for the alternative article set in step S8 (step S10). For example, the information indicating the loading request for the alternative article may be transmitted to the terminal of the staff. As a result, the staff picks and packages the alternative article and loads the alternative article on the unmanned vehicle.

Incidentally, when the loading of the alternative article on the unmanned vehicle is completed, the information on the delivery of the designated article identified in step S2 is registered in the delivery management database 322. The information on the delivery of the designated article includes the delivery designation information acquired in step S1, the loading information of the designated article, and the vehicle information of the unmanned vehicle selected in step S9. Here, the loading information of the designated article includes the stockout flag "True", the article ID of the alternative article set in step S8, and the authentication data necessary for transferring the alternative article. The authentication data may be issued by the management server 3 at the time of registration.

Subsequently, the management server 3 notifies the user related to the delivery destination of the alternative article set in step S8, by the alternative article notifying unit 334 (step S11). For example, the e-mail describing the URL or the like for accessing the alternative article content information indicating the contents of the alternative article may be transmitted to the mail address of the user related to the delivery destination. The alternative article presentation unit 336 presents the alternative article to the user through the URL in a selectable manner.

Figure 10:
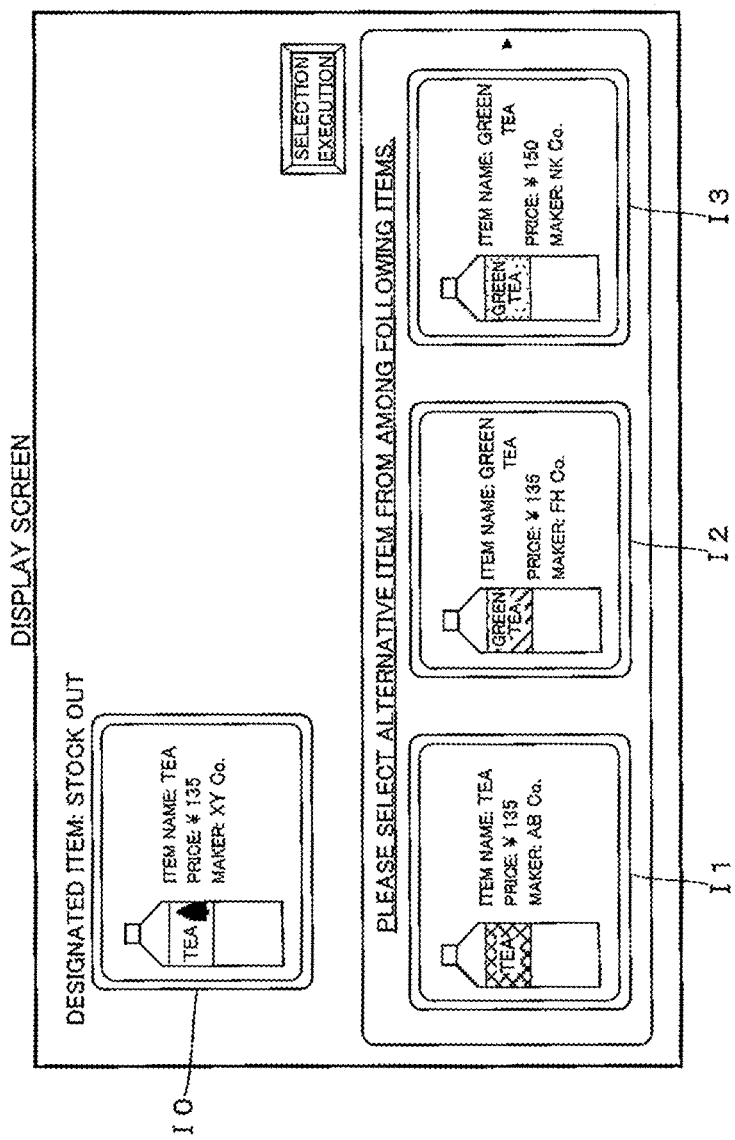
FIG. 10 is a diagram illustrating an example of an alternative article presented to a user related to a delivery destination in a selectable manner.

FIG. 10 is a diagram illustrating an example of the alternative article presented to the user related to the delivery destination in a selectable manner. In the example of FIG. 10, an item name, price, a maker, and an external appearance image of each of designated article (I0) and alternative articles (I1 to I3) thereof are displayed on a display screen. The user related to the delivery destination can select (for example, select a frame in which the item name or the like is displayed and press a selection execution button) one or more alternative articles of the plurality of alternative articles presented in this manner. However, in a case where the user does not desire the alternative article, as described above, the user can perform the cancellation procedure for the designated article designated as the order target on the EC site.

Subsequently, the management server 3 transmits the article ID, the delivery destination information, the delivery timetable, and the loading information of the designated article identified in step S2, the authentication data necessary for transferring the alternative article, and the like to the unmanned vehicle selected in step S9 (step S12), and the processing proceeds to step S13 illustrated in FIG. 7. As a result, the article ID, the delivery destination information, the delivery timetable, the loading information, and the authentication data of the designated article are set to the unmanned vehicle. And then, the unmanned vehicle starts moving toward the delivery destination according to the delivery destination information and the delivery timetable.

In step S13 illustrated in FIG. 7, the management server 3 determines whether or not the cancellation information (including the article ID) indicating the cancellation of the designation of the designated article is received from the commerce system. Such cancellation information is transmitted from the commerce system by performing the cancellation procedure for the designated article designated by the user related to the delivery destination. When it is determined that the cancellation information is accepted (step S13: YES), that is, when the cancellation of the designation of the designated article is accepted by the cancellation acceptance unit 335, the cancellation information is acquired, and the processing proceeds to step S14. On the other hand, when it is determined that the cancellation information is not received (step S13: NO), the processing proceeds to step S17.

In step S14, the management server 3 determines whether or not the unmanned vehicle having the alternative article for the designated article identified by the article ID included in the cancellation information acquired in step S13 loaded thereon already starts moving toward the delivery destination. When it is determined that the unmanned vehicle does not start moving toward the delivery destination yet (step S14: NO), the processing proceeds to step S15. On the other hand, when it is determined that the unmanned vehicle already starts moving toward the delivery destination (step S14: YES), the processing proceeds to step S16.

In step S15, the management server 3 notifies the staff at the loading base of a delivery cancellation request of the alternative article for the designated article identified by the article ID included in the cancellation information (step S10). For example, information indicating the delivery cancellation request may be transmitted to the terminal of the staff. As a result, the staff takes out the alternative article from the unmanned vehicle. Incidentally, in a case where the alternative article for the designated article identified by the article ID included in the cancellation information is loaded on the unmanned vehicle, the departure of the unmanned vehicle can be stopped.

In step S16, the management server 3 stops the movement of the unmanned vehicle having the alternative article for the designated article identified by the article ID included in the cancellation information loaded thereon, and moves the unmanned vehicle toward a predetermined base (for example, a loading base or a transit base) or a different delivery destination. For example, when the delivery stop control command is transmitted to the unmanned vehicle via the communication network NW by the vehicle control unit 339, the movement of the unmanned vehicle is stopped, and the unmanned vehicle moves toward the predetermined base or the different delivery destination.

In step S17, the management server 3 determines whether or not the alternative article selection information and the delivery destination ID related to the selected alternative article are received from the terminal of the user related to the delivery destination or the unmanned vehicle of the delivery destination. When it is determined that the alternative article selection information and the delivery destination ID are received (step S17: YES), that is, when the selection of the alternative article by the user related to the delivery destination is accepted, the alternative article selection information and the delivery destination ID are acquired, and the processing proceeds to step S18. On the other hand, when it is determined that the alternative article selection information and the delivery destination ID are not received (step S17: NO), the processing proceeds to step S20.

In step S18, the management server 3 stores the alternative article selection information and the delivery destination ID acquired in step S17 in association with each other. Subsequently, the management server 3 notifies the user (that is, the user who selects the alternative article) related to the delivery destination identified by the delivery destination ID stored in step S18 of the selection confirmation of the alternative article indicated by the alternative article selection information stored in step S18 (step S19). For example, the e-mail describing the contents (for example, the name, the price, and the like) of the alternative article, the authentication data necessary for transferring the alternative article, and the like may be transmitted to the mail address of the user. Incidentally, when the user who selects the alternative article is the delivery requester, the e-mail may also be transmitted to the mail address of the recipient of the alternative article.

Incidentally, before the selection confirmation is notified in step S19, the management server 3 may determine whether or not the payment of the designated article corresponding to the alternative article indicated by the alternative article selection information is completed and there is the difference in the price between the designated article and the alternative article. When it is determined that the payment of the designated article corresponding to the alternative article is completed and that there is no difference in the price between the designated article and the alternative article (or when the payment of the designated article corresponding to the alternative article is not completed), the management server 3 notifies the selection confirmation in step S19. On the other hand, when it is determined that the payment of the designated article corresponding to the alternative article is completed and there is the difference in the price between the designated article and the alternative article, the management server 3 notifies the selection confirmation in step S19 after performing the processing of eliminating the difference as described above. As a result, after the processing of eliminating the difference is performed, the user who selects the alternative article is notified of the authentication data necessary for transferring the alternative article, and control for transferring the alternative article is performed.

In step S20, the management server 3 determines whether or not alternative article non-selection information indicating that the alternative article is not selected by the user related to the delivery destination and the delivery destination ID are received from the unmanned vehicle of the delivery destination. When it is determined that the alternative article non-selection information and the delivery destination ID are received (step S20: YES), the alternative article non-selection information and the delivery destination ID are acquired, and the processing proceeds to step S21. On the other hand, when it is determined that the alternative article non-selection information and the delivery destination ID are not received (step S20: NO), the processing proceeds to step S23.

In step S21, the management server 3 sets a different alternative article for the designated article identified by the article ID associated with the delivery destination ID acquired in step S20, by the alternative article setting unit 333. Here, the different alternative article is an alternative article that is not loaded on the unmanned vehicle at the delivery destination identified by the delivery destination ID acquired in step S20. When there are a plurality of different alternative articles, the different alternative articles may be set. Incidentally, when there is no different alternative article (out of stock), the different alternative article is not set.

Next, the management server 3 transmits the different alternative article content information indicating the contents of the different alternative article set in step S21 to the unmanned vehicle that has transmitted the alternative article non-selection information (step S22). Here, the management server 3 may calculate a required time until the unmanned vehicle having the different alternative article loaded thereon arrives at the delivery destination again, and may transmit the calculated required time to the unmanned vehicle together with the different alternative article content information. In a case there are the plurality of different alternative articles and the different alternative articles are delivered by different unmanned vehicles, the required time may be calculated for each of the different alternative articles and may be transmitted to the unmanned vehicles. Incidentally, in a case where the different alternative article is not set, different alternative article content information indicating Null is preferably transmitted to the unmanned vehicle.

In step S23, the management server 3 determines whether or not the different alternative article selection information and the delivery destination ID related to the different alternative article selected by the recipient are received from the unmanned vehicle that has received the alternative article content information transmitted in step S22. When it is determined that the different alternative article selection information and the delivery destination ID are received (step S23: YES), that is, when the selection of the different alternative article by the user related to the delivery destination is accepted, the different alternative article selection information and the delivery destination ID are acquired, and the processing proceeds to step S24. On the other hand, when it is determined that the different alternative article selection information and the delivery destination ID are not received (step S23: NO), the processing proceeds to step S27.

In step S24, the management server 3 selects the unmanned vehicle for delivering the different alternative article indicated by the different alternative article selection information acquired in step S23, on the basis of the delivery schedule and the loading status of the unmanned vehicle managed in the vehicle management database 324. The unmanned vehicle selected herein may be a different unmanned vehicle on standby at the loading base having the different alternative article, or may be a different unmanned vehicle on which the different alternative article is loaded and that is on the move. In the former case, similarly to step S10, a loading request for the different alternative article is notified to the staff of the loading base. Alternatively, the different unmanned vehicle may be an unmanned vehicle that has transmitted the different alternative article selection information acquired in step S23, from the unmanned vehicle. In this case, if the unmanned vehicle is the UAV 2, the unmanned vehicle can quickly return to the loading base, can load the different alternative article, and can move to the delivery destination again.

Subsequently, the management server 3 notifies the user (that is, the user who selects the different alternative article) related to the delivery destination identified by the delivery destination ID stored in step S23 of the selection confirmation of the different alternative article (step S25). For example, an e-mail describing the contents (for example, the name, the price, and the like) of the different alternative article, the authentication data necessary for transferring the different alternative article, and the like may be transmitted to the mail address of the user. Subsequently, the management server 3 causes the unmanned vehicle to deliver the different alternative article by transmitting the delivery control command to the unmanned vehicle selected in step S24 (step S26). Here, together with the delivery control command, the article ID of the designated article corresponding to the different alternative article, the delivery destination information of the delivery destination, the delivery timetable, the loading information, the authentication data, and the like may be transmitted to the unmanned vehicle.

In step S27, the management server 3 determines whether or not cancellation request information indicating a cancellation request for the designated article designated by the user related to the delivery destination and the delivery destination ID are received from the unmanned vehicle of the delivery destination. When it is determined that the cancellation request information and the delivery destination ID are received (step S27: YES), the cancellation request information and the delivery destination ID are acquired, and the processing proceeds to step S28. On the other hand, when it is determined that the cancellation request information and the delivery destination ID are not received (step S27: NO), the processing returns to step S1 illustrated in FIG. 6.

In step S28, the management server 3 transmits a cancellation request including the article ID of the designated article to be cancelled and the user ID of the user who has designated the designated article to the commerce system on the basis of the delivery destination ID acquired in step S27. As a result, the order for the designated article is cancelled.

[2.2. Processing of Unmanned Vehicle]

Next, processing of the unmanned vehicle in the article delivery will be described. The processing illustrated in FIG. 8 is started, for example, when the unmanned vehicle starts moving toward the delivery destination. When the processing illustrated in FIG. 8 is started, the unmanned vehicle determines whether or not the delivery stop control command is received from the management server 3 (step S31). When it is determined that the delivery stop control command is received (step S31: YES), the unmanned vehicle stops moving to the delivery destination and returns to, for example, the loading base (step S32). Incidentally, the unmanned vehicle may start moving toward the different delivery destination. In this case, the processing illustrated in FIG. 8 is continued. On the other hand, when it is determined that the delivery cancellation control command is not received (step S31: NO), the processing proceeds to step S33.

In step S33, the unmanned vehicle determines whether or not the delivery control command is received from the management server 3. When it is determined that the delivery control command is received (step S33: YES), the unmanned vehicle sets the delivery destination information and the like received together with the delivery control command and continues to move (step S34). Here, the unmanned vehicle may move toward the delivery destination indicated by the delivery destination information received together with the delivery control command earlier than the delivery destination heading before receiving the delivery control command, on the basis of the required time to the delivery destination or the like. On the other hand, when it is determined that the delivery control command is not received (step S33: NO), the processing proceeds to step S35.

In step S35, it is determined whether or not the unmanned vehicle arrives at the delivery destination. When it is determined that the unmanned vehicle does not arrive at the delivery destination (step S35: NO), the processing returns to step S31. On the other hand, when it is determined that the unmanned vehicle arrives at the delivery destination (step S35: YES), the processing proceeds to step S36. In step S36, the unmanned vehicle determines whether or not the stockout flag included in the loading information associated with the delivery destination ID of the delivery destination is "True". When it is determined that the stockout flag is not "True" (that is, "False") (step S36: NO), the processing proceeds to step S37. On the other hand, when it is determined that the stockout flag is "True" (step S36: YES), the processing proceeds to step S39.

In step S37, the control for transferring the designated article is performed at the delivery destination. In a case where the unmanned vehicle is the UGV 1, the control unit 17 acquires the input data input from the display Di by the recipient. And then, the control unit 17 performs authentication processing by using the acquired input data and the authentication data associated with the delivery destination ID of the delivery destination, and unlocks the door Do of the storage B storing the designated article to open the door Do and allows the storage box C of the designated article to be taken out if the input data is authenticated. As a result, the recipient takes out the designated article.

On the other hand, in a case where the unmanned vehicle is the UAV 2 and lands on the take-off and landing port having the operation panel at the delivery destination, the control unit 26 acquires the input data input from the operation panel by the recipient. And then, the control unit 26 performs authentication processing by using the acquired input data and the authentication data associated with the delivery destination ID of the delivery destination, and unlocks the pin P of the separation suppressing unit L holding the designated article to remove the pin from the ring of the storage box C and allows the storage box C of the designated article to be separated if the input data is authenticated. As a result, the recipient takes out the designated article.

Subsequently, the unmanned vehicle returns to, for example, the loading base (step S38). Incidentally, the unmanned vehicle may start moving toward the different delivery destination. In this case, the processing illustrated in FIG. 8 is continued.

In step S39, the unmanned vehicle accesses the management server 3 and acquires the alternative article selection information associated with the delivery destination ID of the delivery destination from the management server 3. Subsequently, the unmanned vehicle determines whether or not the alternative article is selected by the user related to the delivery destination on the basis of the alternative article selection information acquired in step S39 (step S40). If the acquired alternative article selection information indicates the article ID, it is determined that the alternative article is selected by the user (step S40: YES), and the processing proceeds to step S41. On the other hand, if the acquired alternative article selection information indicates Null, it is determined that the alternative article is not selected by the user (step S40: NO), and the processing proceeds to step S42 illustrated in FIG. 9.

In step S41, the control for transferring the selected alternative article is performed, and the processing proceeds to step S38. For example, in a case where the unmanned vehicle is the UGV 1, the control unit 17 acquires the input data input from the display Di by the recipient of the selected alternative article. And then, the control unit 17 performs the authentication processing by using the acquired input data and the authentication data associated with the delivery destination ID of the delivery destination, and unlocks the door Do of the storage B storing the selected alternative article to open the door Do and allows the storage box C of the alternative article to be taken out if the input data is authenticated. As a result, the recipient takes out the alternative article.

On the other hand, in a case where the unmanned vehicle is the UAV 2 and lands on the take-off and landing port having the operation panel at the delivery destination, the control unit 26 acquires the input data input from the operation panel by the recipient of the selected alternative article. And then, the control unit 26 performs the authentication processing by using the acquired input data and the authentication data associated with the delivery destination ID of the delivery destination, and unlocks the pin P of the separation suppressing unit L holding the selected alternative article to remove the pin from the ring of the storage box C and allows the storage box C of the alternative article to be separated if the input data is authenticated. As a result, the recipient takes out the alternative article.

In step S42 illustrated in FIG. 9, it is determined whether or not the unmanned vehicle can stand by at the delivery destination. When it is determined that the unmanned vehicle is not able to stand by at the delivery destination (step S42: NO), the cancellation request information indicating the cancellation request for the designated article designated by the user related to the delivery destination and the delivery destination ID are transmitted to the management server 3 (step S43), and the processing proceeds to step S38 illustrated in FIG. 8. On the other hand, when it is determined that the unmanned vehicle can stand by at the delivery destination (step S42: YES), the counting of a standby elapsed time is started, and the processing proceeds to step S44.

In step S44, the unmanned vehicle presents the loaded alternative article to the recipient in a selectable manner. The alternative article presented herein is an alternative article identified by the article ID (article ID of the alternative article) included in the loading information associated with the delivery destination ID of the delivery destination. In a case where the unmanned vehicle is the UGV 1, the control unit 17 displays the alternative article on the display Di as illustrated in FIG. 10. On the other hand, in a case where the unmanned vehicle is the UAV 2 and the unmanned vehicle lands on the take-off and landing port having the operation panel at the delivery destination, the control unit 26 displays the alternative article on the operation panel by short-range wireless communication.

Subsequently, the unmanned vehicle determines whether or not the alternative article is selected by the recipient (step S45). When it is determined that the alternative article is selected by the recipient (step S45: YES), the alternative article selection information indicating the alternative article selected by the recipient is acquired, and the processing proceeds to step S46. On the other hand, when it is determined that the alternative article is not selected by the recipient (step S45: NO), the processing proceeds to step S47. In step S46, the unmanned vehicle transmits the alternative article selection information acquired in step S45 and the delivery destination ID of the delivery destination to the management server 3. Thereafter, the processing proceeds to step S41, and after the control for transferring the selected alternative article is performed, the processing proceeds to step S38.

Figure 11:
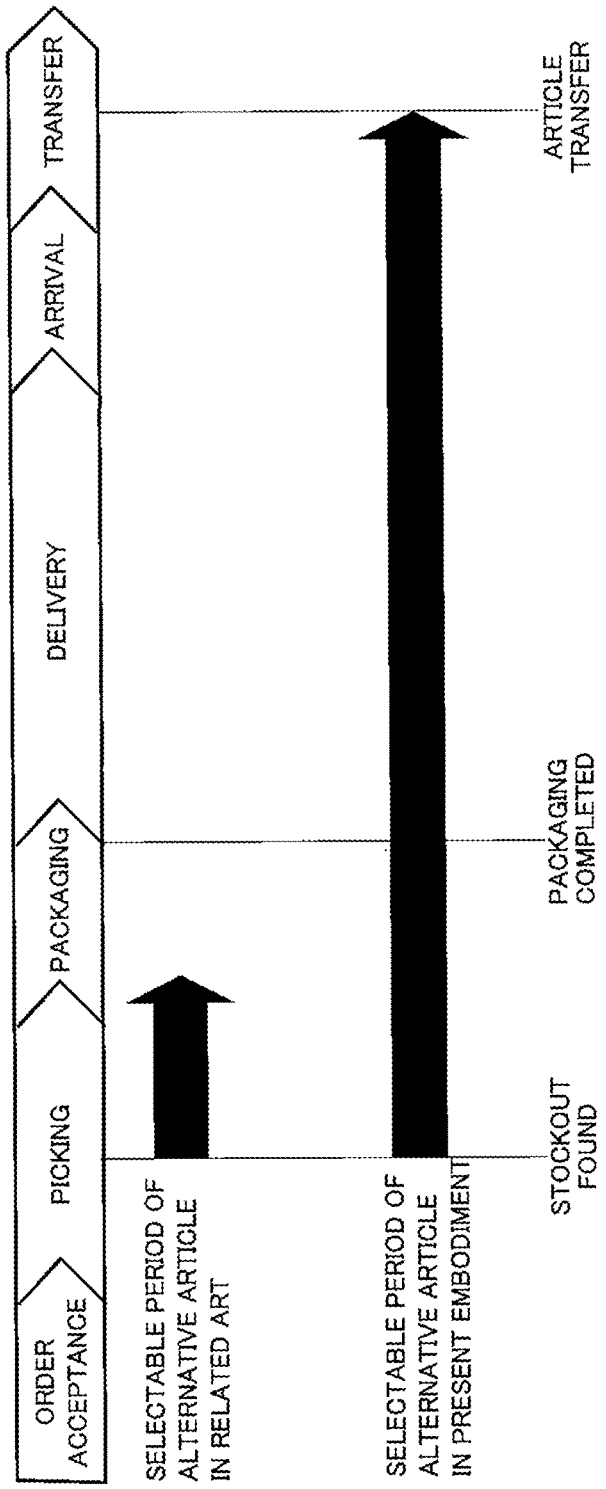
FIG. 11 is a diagram illustrating a comparative example of a selectable period of the alternative article in the related art and a selectable period of the alternative article in a present embodiment.

FIG. 11 is a diagram illustrating a comparative example of a selectable period of the alternative article in the related art and a selectable period of the alternative article in the present embodiment. As illustrated in FIG. 11, the selectable period of the alternative article in the related art is before the start of delivery of the alternative article (for example, before being packed), whereas the selectable period of the alternative article in the present embodiment is after delivery of the alternative article and immediately before transfer. Therefore, in the present embodiment, the selectable period of the alternative article can be extended as compared with the related art, and the convenience of the user related to the delivery destination can be improved in selecting the alternative article.

In step S47, it is determined whether or not a predetermined time elapses from the start of counting of the standby elapsed time in step S42. When it is determined that the predetermined time does not elapse from the start of counting of the standby elapsed time (step S47: NO), the processing returns to step S45. On the other hand, when it is determined that the predetermined time elapses from the start of counting of the standby elapsed time (step S47: YES), the unmanned vehicle transmits the alternative article non-selection information indicating that the alternative article is not selected and the delivery destination ID to the management server 3 (step S48). At this time, the counting of the standby elapsed time is reset, and the counting of the standby elapsed time is started again. Incidentally, the recipient may not explicitly select the alternative article presented in step S44. For example, a button for requesting presentation of the different alternative article not loaded on the unmanned vehicle is displayed on a selection screen illustrated in FIG. 10, and when the recipient presses the button, the unmanned vehicle transmits the alternative article non-selection information indicating that the alternative article is not selected and the delivery destination ID to the management server 3 in step S48.

Moreover, as described above, the selection screen illustrated in FIG. 10 can also be displayed on the terminal of the user related to the delivery destination. However, in this case, the button for requesting the presentation of the different alternative article not loaded on the unmanned vehicle may be displayed on the selection screen displayed on the terminal. In this case, when the user related to the delivery destination presses the button, the terminal transmits the alternative article non-selection information indicating that the alternative article is not selected and the delivery destination ID to the management server 3. And then, when the alternative article non-selection information and the delivery destination ID are received from the terminal of the user related to the delivery destination, the management server 3 sets the different alternative article for the designated article identified by the article ID associated with the acquired delivery destination ID, and transmits the different alternative article content information indicating the contents of the set different alternative article to the terminal that transmits the alternative article non-selection information.

Subsequently, when the unmanned vehicle receives the different alternative article content information indicating the contents of the different alternative article from the management server 3 (step S49), the unmanned vehicle presents the different alternative article to the recipient in a selectable manner on the basis of the different alternative article content information (step S50). Here, when the required time until the unmanned vehicle arrives at the delivery destination is received together with the different alternative article content information from the management server 3, the required time is presented to the recipient together with the different alternative article. Moreover, in a case where the required time is received for each of a plurality of different alternative articles, the required time for each of the different alternative articles is presented to the recipient. Incidentally, in a case where the alternative article content information indicates Null, information indicating that the alternative article content information indicates Null is presented to the recipient.

Figure 12:
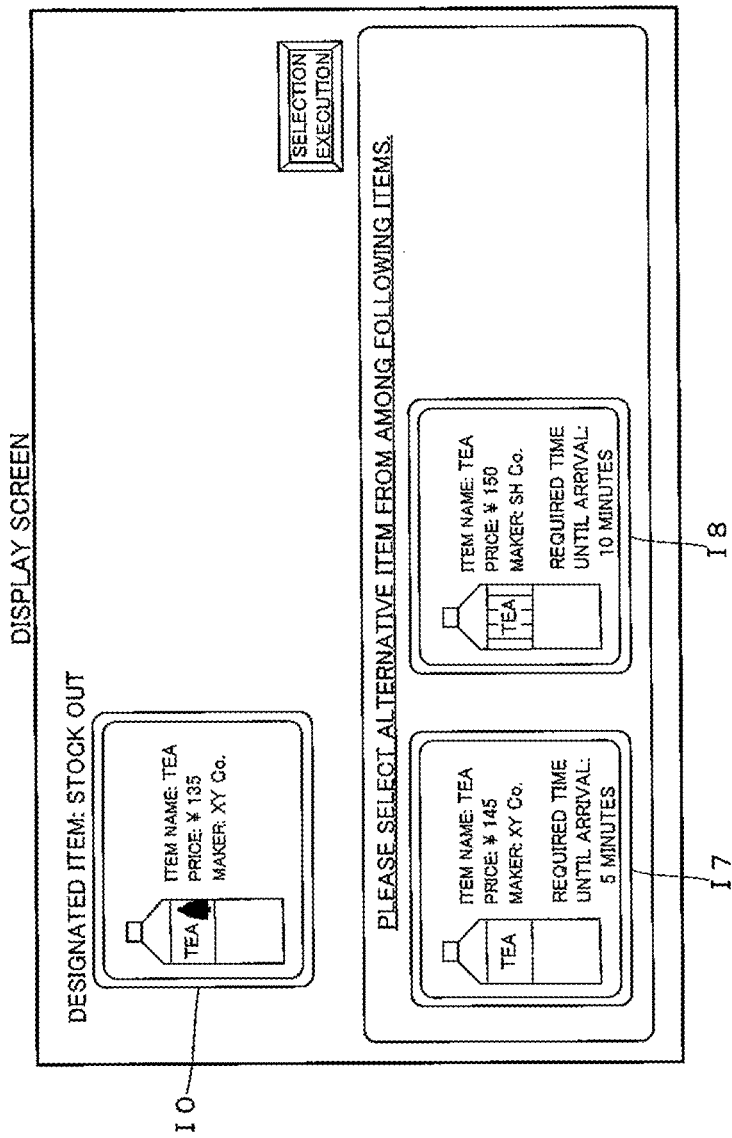
FIG. 12 is a diagram illustrating an example of a different alternative article presented to the user related to the delivery destination in a selectable manner.

FIG. 12 is a diagram illustrating an example of the other alternative article presented to the user related to the delivery destination in a selectable manner. In the example of FIG. 12, the item name, the price, the maker, the appearance image, and the required time of each of the designated article (I0) and the alternative articles (I7 and I8) thereof are displayed on the display screen. The user related to the delivery destination can select one or more alternative articles from the plurality of different alternative articles presented in this manner. However, the user may not select the different alternative article. Incidentally, in a case Where the different alternative article content information is transmitted from the management server 3 to the terminal of the user related to the delivery destination, the selection screen illustrated in FIG. 12 is displayed on the terminal.

Subsequently, the unmanned vehicle determines whether or not the different alternative article is selected by the recipient (step S51). When it is determined that the different alternative article is selected by the recipient (step S51: YES), the different alternative article selection information indicating the different alternative article selected by the recipient is acquired, and the processing proceeds to step S52. On the other hand, when it is determined that the different alternative article is not selected by the recipient (step S51: NO), the processing proceeds to step S53. In step S52, the unmanned vehicle transmits the different alternative article selection information acquired in step S51 and the delivery destination ID of the delivery destination to the management server 3. Thereafter, the processing proceeds to step S38. When the different alternative article selection information or the like transmitted from the unmanned vehicle is received by the management server 3, the processing of steps S24 to S26 is performed as described above. Incidentally, when the different alternative article is selected (for example, is selected on the display screen illustrated in FIG. 12) on the terminal of the user related to the delivery destination, the different alternative article selection information indicating the selected different alternative article and the delivery destination ID are transmitted from the terminal to the management server 3. In this case, when the different alternative article selection information and the delivery destination ID is received from the terminal of the user related to the delivery destination, the management server 3 performs processing similar to steps S24 to S26 described above.

In step S53, it is determined whether or not a predetermined time elapses from the start of counting of the standby elapsed time in step S48. When it is determined that the predetermined time does not elapse from the start of counting of the standby elapsed time (step S53: NO), the processing returns to step S51. On the other hand, when it is determined that the predetermined time elapses from the start of counting the standby elapsed time (step S53: YES), the processing proceeds to step S43, and the cancellation request information and the delivery destination ID are transmitted to the management server 3.

As described above, according to the above embodiment, after the unmanned vehicle having one or more alternative articles for the designated article designated as the delivery target for the delivery destination (the designated article being found to be undeliverable after the article is designated) starts moving toward the delivery destination, the alternative article selection information indicating the alternative article selected by the user related to the delivery destination from among the one or more alternative articles is acquired, and the control for transferring the alternative article indicated by the alternative article selection information at the delivery destination is performed. Thus, even when the designated article is designated as the delivery target for the delivery destination and then found to be undeliverable, the alternative article for the designated article is efficiently deliverable.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the management server 3 may acquire the input data input from the display Di or the operation panel by the recipient at the delivery destination, and may perform the authentication processing by using the acquired input data and the authentication data associated with the delivery destination ID of the delivery destination. If the input data is authenticated, the management server 3 may perform the control for transferring the alternative article by transmitting the transfer control command to the unmanned vehicle.

REFERENCE SIGNS LIST

1 UAV
2 UGV
3 Management server
11, 21 Drive unit
12, 22 Positioning unit
13, 23 Communication unit
14, 24 Sensor unit
15 Operation and display unit
16, 25 Storage unit
17, 26 Control unit
31 Communication unit
32 Storage unit
33 Control unit
331 Article identifying unit
332 Deliverable or undeliverable determining unit
333 Alternative article setting unit
334 Alternative article notifying unit
335 Cancellation acceptance unit
336 Alternative article presentation unit
337 Alternative article selection information acquisition unit
338 Price difference processing unit
339 Vehicle control unit
NW Communication network

What is claimed is:
1. An article delivery system comprising:
a first unmanned vehicle configured to load one or more alternative articles for an article designated as a delivery target for a delivery destination, the article being determined undeliverable after the article is designated; and
at least one memory configured to store program code; and at least one processor configured to access the program code and operate as instructed by the program code, the program code including:
vehicle selection code configured to cause the at least one processor to select the first unmanned vehicle from among a plurality of unmanned vehicles based on loading status information comprising at least one of:
one or more article IDs corresponding to one or more articles loaded onto the first unmanned vehicle;
size information corresponding to one or more first sizes of the one or more articles loaded onto the first unmanned vehicle; or
availability information indicating a number of articles available to be loaded onto the first unmanned vehicle;
stock confirmation code configured to cause the at least one processor to receive, from a terminal, a stock confirmation result corresponding to one from among a first value and a second value, wherein the article is determined undeliverable based on the stock confirmation result corresponding to the first value;
acquisition code configured to cause the at least one processor to acquire first alternative article selection information indicating an alternative article ID corresponding to a first alternative article, transmitted from a user of a user terminal, corresponding to the delivery destination, wherein the first alternative article is one from among the one or more alternative articles, and wherein the alternative article ID is transmitted after the first unmanned vehicle starts moving toward the delivery destination;
movement control code configured to cause the at least one processor to move the first unmanned vehicle toward the delivery destination based on radio waves transmitted to the first unmanned vehicle from a Global Navigation Satellite System (GNSS) satellite; and
transfer control code configured to cause the at least one processor to perform control for transferring the first alternative article at the delivery destination,
wherein the transfer control code is configured to cause the at least one processor to:
acquire input data comprising:
a plurality of numbers and symbols, or
biometric data;
determine an authentication result based on the input data and authentication data associated with a delivery destination ID of the delivery destination; and
transmit unlocking information to the first unmanned vehicle to cause the first unmanned vehicle to, based on the authentication result, release a lock of a door of the first unmanned vehicle or cause an actuator to move a pin of the first unmanned vehicle from a closed state to an opened state.

2. The article delivery system according to claim 1, wherein the acquisition code causes the at least one processor to set the one or more alternative articles before the first unmanned vehicle starts moving toward the delivery destination.

3. The article delivery system according to claim 1, the program code further including:
presentation code configured to cause the at least one processor to present, to the user in a selectable manner, one or more loaded alternative articles on the first unmanned vehicle,
wherein the acquisition code causes the at least one processor to acquire second alternative article selection information indicating a second alternative article selected by the user from among the loaded alternative articles.

4. The article delivery system according to claim 3, wherein
the presentation code causes the at least one processor to, when no alternative article is selected by the user from among the loaded alternative articles, present to the user a different third alternative article not loaded onto the first unmanned vehicle, and
the movement control code is configured to cause the at least one processor to, after the third alternative article is selected by the user, move the first unmanned vehicle or a different second unmanned vehicle toward the delivery destination, the first unmanned vehicle or the second unmanned vehicle having the third alternative article.

5. The article delivery system according to claim 4, wherein the presentation code causes the at least one processor to present, to the user, the third alternative article and a required time until the first unmanned vehicle or the second unmanned vehicle arrives at the delivery destination.

6. The article delivery system according to claim 1, the program code further including:
notifying code configured to cause the at least one processor to notify the user of the first alternative article before or after the first unmanned vehicle starts moving toward the delivery destination; and
acceptance code configured to cause the at least one processor to accept cancelation of designation of the article.

7. The article delivery system according to claim 6, wherein the movement control code is configured to cause the at least one processor to, when the cancelation is accepted after the first unmanned vehicle starts moving toward the delivery destination, stop the movement, and move the first unmanned vehicle toward a predetermined base or a different delivery destination.

8. The article delivery system according to claim 1, the program code further including:
setting code configured to cause the at least one processor to preferentially set, a second alternative article, from among the one or more alternative articles, to be loaded onto the first unmanned vehicle,
wherein the second alternative article has a relatively high degree of relevance among the one or more alternative articles, based on relevance degree information indicating degrees of relevance between the article and the one or more alternative articles.

9. The article delivery system according to claim 1, the program code further including:
setting code configured to cause the at least one processor to preferentially set, as a second alternative article, from among the one or more alternative articles, to be loaded onto the first unmanned vehicle,
wherein the second alternative article has a relatively high number of times or a relatively high frequency among the one or more alternative articles, based on history information, and
wherein the history information indicates a number of times or a frequency that the one or more alternative articles have been selected as the first alternative article.

10. The article delivery system according to claim 1,
wherein the article is an item for which payment is completed, and
the program code further includes processing code configured to cause the at least one processor to, when there is a difference in price between the article and the first alternative article, perform processing to resolve the difference in price before the control for transferring the first alternative article is performed.

11. An unmanned vehicle configured to load one or more alternative articles for an article designated as a delivery target for a delivery destination, the article being determined undeliverable after the article is designated, the unmanned vehicle comprising:
at least one memory configured to store program code; and
at least one processor configured to access the program code and operate as instructed by the program code, the program code including:
vehicle information code configured to cause the at least one processor to:

transmit loading status information comprising at least one of:
- one or more article IDs corresponding to one or more articles loaded onto the unmanned vehicle;
- size information corresponding to one or more first sizes of the one or more articles loaded onto the unmanned vehicle; or
- availability information indicating a number of articles available to be loaded onto the unmanned vehicle;

movement control code configured to cause the at least one processor to move the unmanned vehicle toward the delivery destination based on radio waves transmitted to the unmanned vehicle from a Global Navigation Satellite System (GNSS) satellite;

acquisition code configured to cause the at least one processor to acquire alternative article selection information indicating an alternative article ID corresponding to an alternative article, transmitted from a user of a user terminal, corresponding to the delivery destination, wherein the alternative article is one from among the one or more alternative articles, and wherein the alternative article ID is transmitted after the unmanned vehicle starts moving toward the delivery destination; and transfer control code configured to cause the at least one processor to perform control for transferring the alternative article at the delivery destination, wherein the transfer control code is configured to cause the at least one processor to:
acquire input data comprising:
- a plurality of numbers and symbols, or
- biometric data;

determine an authentication result based on the input data and authentication data associated with a delivery destination ID of the delivery destination; and based on the authentication result, release a lock of a door of the unmanned vehicle or cause an actuator to move a pin of the unmanned vehicle from a closed state to an opened state.

\* \* \* \* \*